US012625339B2

(12) United States Patent     (10) Patent No.:   US 12,625,339 B2

Burkett et al.     (45) Date of Patent:    May 12, 2026

(54) HIGH DENSITY OPTICAL SPLITTER WITH INTERNAL FANOUT DEVICE

(71) Applicant: CORNING RESEARCH & DEVELOPMENT CORPORATION, Corning, NY (US)

(72) Inventors: Alan Duncan Burkett, Bedford, TX (US); William Julius McPhil Giraud, Azle, TX (US); Lingling Hu, Fort Worth, TX (US)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 253 days.

(21) Appl. No.: 18/340,254

(22) Filed: Jun. 23, 2023

(65) Prior Publication Data

US 2024/0019655 A1     Jan. 18, 2024

Related U.S. Application Data

(60) Provisional application No. 63/389,079, filed on Jul. 14, 2022.

(51) Int. Cl.
    G02B 6/44      (2006.01)
    G02B 6/38      (2006.01)

(52) U.S. Cl.
    CPC ....... G02B 6/44715 (2023.05); G02B 6/3879 (2013.01); G02B 6/44524 (2023.05)

(58) Field of Classification Search
    CPC ............ G02B 6/44715; G02B 6/44524; G02B 6/3879
    See application file for complete search history.

(56) References Cited

U.S. PATENT DOCUMENTS

| | | | |
|---|---|---|---|
| 7,756,382 B2 | 7/2010 | Saravanos et al. | |
| RE48,082 E | 7/2020 | Castonguay et al. | |
| 2017/0293100 A1* | 10/2017 | Solheid ................. | G02B 6/445 |

* cited by examiner

*Primary Examiner* — Sung H Pak
(74) *Attorney, Agent, or Firm* — Kapil U. Banakar

(57) ABSTRACT

An optical splitter module for splitting an input signal from an input optical fiber is provided. The optical splitter module includes the input optical fiber, output optical fibers, and a splitter device configured to split the input signal from the input optical fiber into a plurality of output signals that are each directed into one of the output optical fibers. The optical splitter module also includes a fanout device defining openings that are each configured to receive one of the output optical fibers. The optical splitter module defines an internal volume and an exit cavity. The input optical fiber, the output optical fibers, the splitter device, and the fanout device are each received in the internal volume. The fanout device defines a side length, the exit cavity defines a width, and the side length of the fanout device is greater than the width of the exit cavity.

24 Claims, 22 Drawing Sheets

500

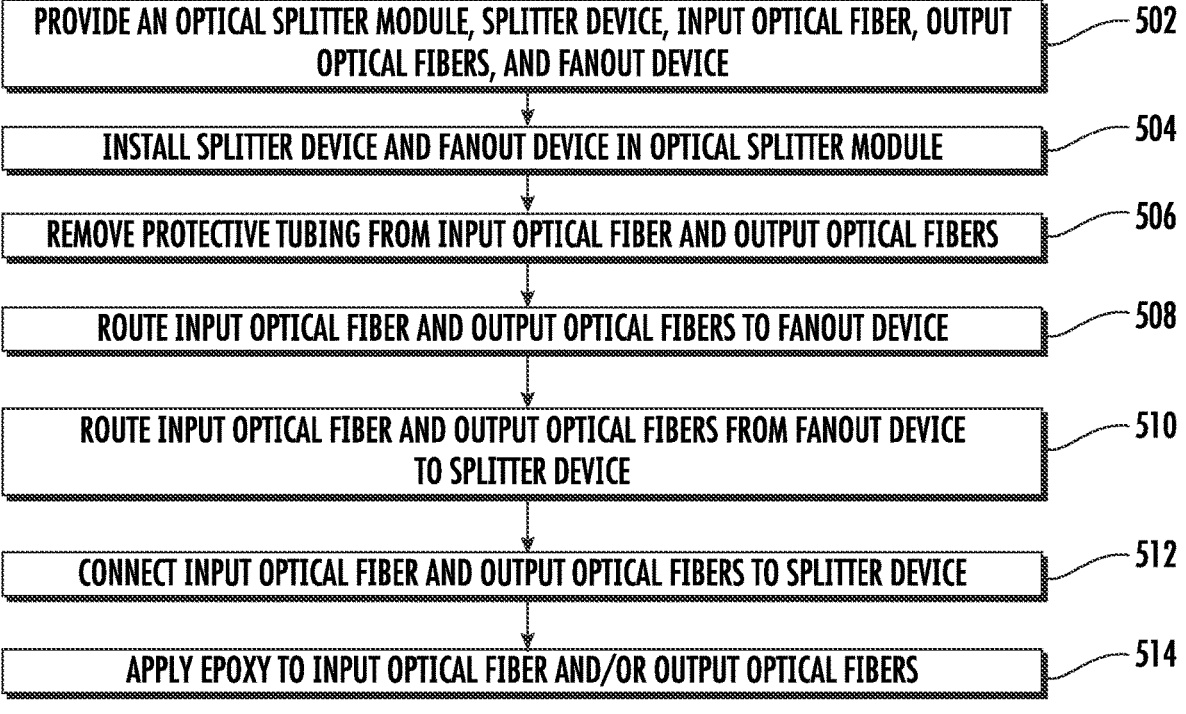

| |
|---|
| PROVIDE AN OPTICAL SPLITTER MODULE, SPLITTER DEVICE, INPUT OPTICAL FIBER, OUTPUT OPTICAL FIBERS, AND FANOUT DEVICE — 502 |
| INSTALL SPLITTER DEVICE AND FANOUT DEVICE IN OPTICAL SPLITTER MODULE — 504 |
| REMOVE PROTECTIVE TUBING FROM INPUT OPTICAL FIBER AND OUTPUT OPTICAL FIBERS — 506 |
| ROUTE INPUT OPTICAL FIBER AND OUTPUT OPTICAL FIBERS TO FANOUT DEVICE — 508 |
| ROUTE INPUT OPTICAL FIBER AND OUTPUT OPTICAL FIBERS FROM FANOUT DEVICE TO SPLITTER DEVICE — 510 |
| CONNECT INPUT OPTICAL FIBER AND OUTPUT OPTICAL FIBERS TO SPLITTER DEVICE — 512 |
| APPLY EPOXY TO INPUT OPTICAL FIBER AND/OR OUTPUT OPTICAL FIBERS — 514 |

FIG. 5

600

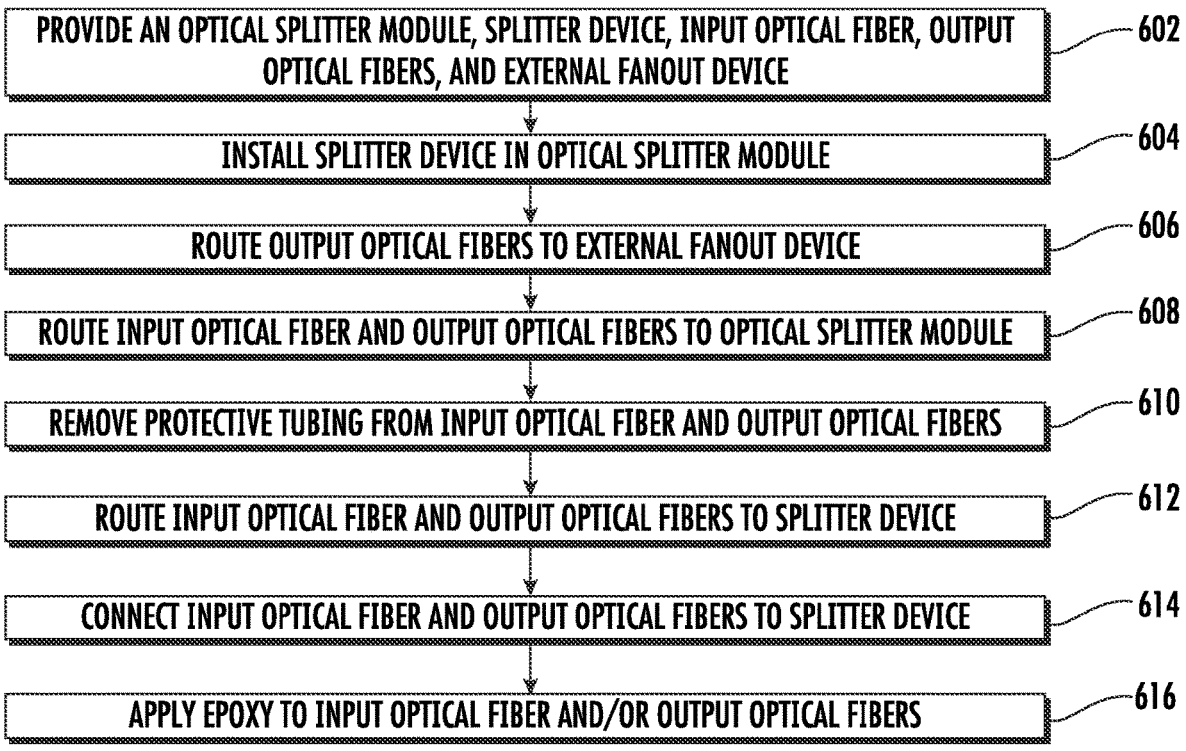

PROVIDE AN OPTICAL SPLITTER MODULE, SPLITTER DEVICE, INPUT OPTICAL FIBER, OUTPUT OPTICAL FIBERS, AND EXTERNAL FANOUT DEVICE — 602

INSTALL SPLITTER DEVICE IN OPTICAL SPLITTER MODULE — 604

ROUTE OUTPUT OPTICAL FIBERS TO EXTERNAL FANOUT DEVICE — 606

ROUTE INPUT OPTICAL FIBER AND OUTPUT OPTICAL FIBERS TO OPTICAL SPLITTER MODULE — 608

REMOVE PROTECTIVE TUBING FROM INPUT OPTICAL FIBER AND OUTPUT OPTICAL FIBERS — 610

ROUTE INPUT OPTICAL FIBER AND OUTPUT OPTICAL FIBERS TO SPLITTER DEVICE — 612

CONNECT INPUT OPTICAL FIBER AND OUTPUT OPTICAL FIBERS TO SPLITTER DEVICE — 614

APPLY EPOXY TO INPUT OPTICAL FIBER AND/OR OUTPUT OPTICAL FIBERS — 616

FIG. 6

HIGH DENSITY OPTICAL SPLITTER WITH INTERNAL FANOUT DEVICE

PRIORITY APPLICATION

This application claims the benefit of priority of U.S. Provisional Application No. 63/389,079, filed on Jul. 14, 2022, the content of which is relied upon and incorporated herein by reference in its entirety.

FIELD OF THE INVENTION

Embodiments of the present invention relate to optical splitter modules having high split densities.

BACKGROUND OF THE INVENTION

Optical splitter modules are integral passive optical devices that play a critical role in optical fiber communications. Optical splitter modules typically are rectangular in shape with the input and output optical fibers located on one side. They usually mount in Fiber Distribution Hub (FDH) and Multi Dwelling Unit (MDU) enclosures using tracks, snaps or screws.

Optical splitter modules are often used for optical fiber communications such as passive optical networks (PON). Optical splitter modules frequently have one or two input ports and N output ports (N=2, 4, 8, 16, 32, 64, 128, etc.). An optical fiber enters the optical splitter module through the input port(s), with an incoming optical signal being provided in the optical fiber. The incoming optical signal is divided evenly into optical fibers in the N output ports. Each optical fiber in an output port goes to a transient node or directly to a subscriber. As a result, the splitter modules help maximize the functionality of an optical network. The splitter modules typically contain no electronics and do not require any power to work.

With increasing optical fiber access worldwide and the deployment of fiber to the X (FTTX) architectures, more and more subscribers are being added into networks. Consequently, an increased demand is arising for signal splitting products. At the same time, adding more splitter modules consumes more space in hubs or nodes.

SUMMARY OF THE INVENTION

Various embodiments described herein relate to fiber optic splitter modules, such as used in telecommunications enclosures or fiber distribution hubs. More specifically, embodiments relate to high density optical splitter modules having an increased number of splits within a confined volume. This may be accomplished, in some embodiments, by using ultra bend performance fiber and/or beneficial fanout designs. Various embodiments provide high-density optical splitter modules that are capable of providing an increased splitting capacity without requiring additional space for fiber optic splitter modules. This enables providing even more services (e.g., more output fibers) without the need for larger transmission equipment in any central office. Further, by limiting the space required for the optical splitter modules, additional free space may be provided in enclosures, such as in Fiber Distribution Hubs (FDHs), that may be used for alternative purposes.

In an example embodiment, an optical splitter module is provided for splitting an input signal from an input optical fiber. The optical splitter module includes the input optical fiber, a plurality of output optical fibers, and a splitter device.

The splitter device is configured to split the input signal from the input optical fiber into a plurality of output signals that are each directed into one of the plurality of output optical fibers. The optical splitter module also includes a fanout device defining a plurality of openings that are each configured to receive an output optical fiber of the plurality of output optical fibers. The optical splitter module defines an internal volume and an exit cavity. The input optical fiber, the plurality of output optical fibers, the splitter device, and the fanout device are each received in the internal volume. The fanout device defines a side length, and the exit cavity defines a width. The side length of the fanout device is greater than the width of the exit cavity.

In some embodiments, the fanout device may be configured to receive a portion of covered output optical fibers, and the covered output optical fibers may each include protective tubing. Additionally, in some embodiments, the covered output optical fibers may extend through the exit cavity, and the width of the exit cavity may be 1.68 inches or less. In some embodiments, each of the covered output optical fibers may have a diameter of approximately 0.063 inches.

In some embodiments, the split density of the optical splitter module may be greater than five or more splits per cubic inch, with the split density being a number of output optical fibers in the optical splitter module divided by a number of input optical fibers in the optical splitter module as well as a volume of the optical splitter module. In some embodiments, the split density of the optical splitter module may be 13.6 or more splits per cubic inch. Furthermore, in some embodiments, the split density of the optical splitter module is 17.3 or more splits per cubic inch. The plurality of output optical fibers may each be bend insensitive fibers in some embodiments. Additionally, in some embodiments, the plurality of output optical fibers may each possess a minimum bending radius of approximately 5 millimeters or less. In some embodiments, the plurality of output optical fibers may each be ITU-T G.657.B3 fibers.

In some embodiments, the fanout device may be integrally attached to the optical splitter module. The fanout device may be removably attachable to the optical splitter module in some embodiments. Furthermore, in some embodiments, the fanout device may be configured to provide strain relief for the plurality of output optical fibers.

In some embodiments, the fanout device may define an internal cavity, and the internal cavity may be configured to receive an epoxy to at least partially restrict movement of the plurality of output optical fibers in the internal cavity. Furthermore, in some embodiments, an opening of the plurality of openings may be configured to receive three or more output optical fibers. Additionally, in some embodiments, covered output optical fibers may each be received in an opening of the plurality of openings.

In some embodiments, the fanout device may have a non-linear shape or may be configured to extend diagonally in the optical splitter module. In some embodiments, the side length of the fanout device may be greater than the width of the exit cavity, and this may permit additional openings to be provided in the fanout device so that additional output optical fibers may be received in the fanout device.

In another example embodiment, an optical splitter module is provided for splitting an input signal from an input optical fiber. The optical splitter module includes the input optical fiber and a plurality of output optical fibers. The optical splitter module also includes a splitter device configured to split the input signal from the input optical fiber into a plurality of output signals that are each directed into one of the plurality of output optical fibers. The optical splitter module also includes a fanout device defining a plurality of openings that are each configured to receive an output optical fiber of the plurality of output optical fibers to control an exit position thereof. A split density is a number of output optical fibers in the optical splitter module divided by a number of input optical fibers in the optical splitter module as well as a volume of the optical splitter module, and the split density of the optical splitter module is greater than five or more splits per cubic inch.

In some embodiments, the fanout device may be configured to receive a portion of covered output optical fibers, and the covered output optical fibers may each include protective tubing. Additionally, in some embodiments, the split density of the optical splitter module may be 17.3 or more splits per cubic inch.

In another example embodiment, an optical splitter module for splitting an input signal from an input optical fiber is provided. The optical splitter module includes the input optical fiber and a plurality of output optical fibers. The optical splitter module also includes a splitter device configured to split the input signal from the input optical fiber into a plurality of output signals that are each directed into one of the plurality of output optical fibers. The optical splitter module also includes a fanout device defining a plurality of openings that are each configured to receive an output optical fiber of the plurality of output optical fibers. The optical splitter module defines an internal volume and an exit cavity. The input optical fiber, the plurality of output optical fibers, the splitter device, and the fanout device are each received in the internal volume. Further, the fanout device either has a non-linear shape or extends diagonally in the optical splitter module with respect to the exit cavity.

In another example embodiment, a fanout device is provided for use in an optical splitter module for splitting an input signal from an input optical fiber into a plurality of output signals that are each directed into one of a plurality of output optical fibers. The fanout device has walls that define a plurality of openings. The plurality of openings are configured to receive the input optical fiber and the plurality of output optical fibers. The fanout device is either non-linear in shape or configured to extend diagonally in the optical splitter module. Additionally, the fanout device is configured to provide strain relief to the input optical fiber and the plurality of output optical fibers.

In another example embodiment, a method of manufacturing an optical splitter module used for splitting an input signal from an input optical fiber is provided. The method includes providing an optical splitter module, providing the input optical fiber, and providing a plurality of output optical fibers. The method also includes providing a splitter device configured to split the input signal from the input optical fiber into a plurality of output signals that are each directed into one of the plurality of output optical fibers. The method further includes providing a fanout device defining a plurality of openings that are each configured to receive an output optical fiber of the plurality of output optical fibers, installing the splitter device in the optical splitter module, installing the fanout device in the optical splitter module, routing the plurality of output optical fibers to the fanout device, and connecting the input optical fiber and the plurality of output optical fibers to the splitter device. The optical splitter module defines an internal volume and an exit cavity. The input optical fiber, the plurality of output optical fibers, the splitter device, and the fanout device are each received in the internal volume. Additionally, the fanout device is either non-linear in shape or extends diagonally in the optical splitter module. In some embodiments, the method may also include applying epoxy to at least one of the input optical fiber or the output optical fibers.

Further areas of applicability of the present invention will become apparent from the detailed description provided hereinafter. It should be understood that the detailed description and specific examples, while indicating examples of preferred embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, which are not necessarily to scale, wherein:

FIG. 5 is a flow chart illustrating an example method of manufacture for an optical splitter assembly using an internal fanout device, in accordance with some embodiments discussed herein; and FIG. 6 is a flow chart illustrating an example method of manufacture for an optical splitter assembly using external fanout devices, in accordance with some embodiments discussed herein.

DETAILED DESCRIPTION

Figure 1A:
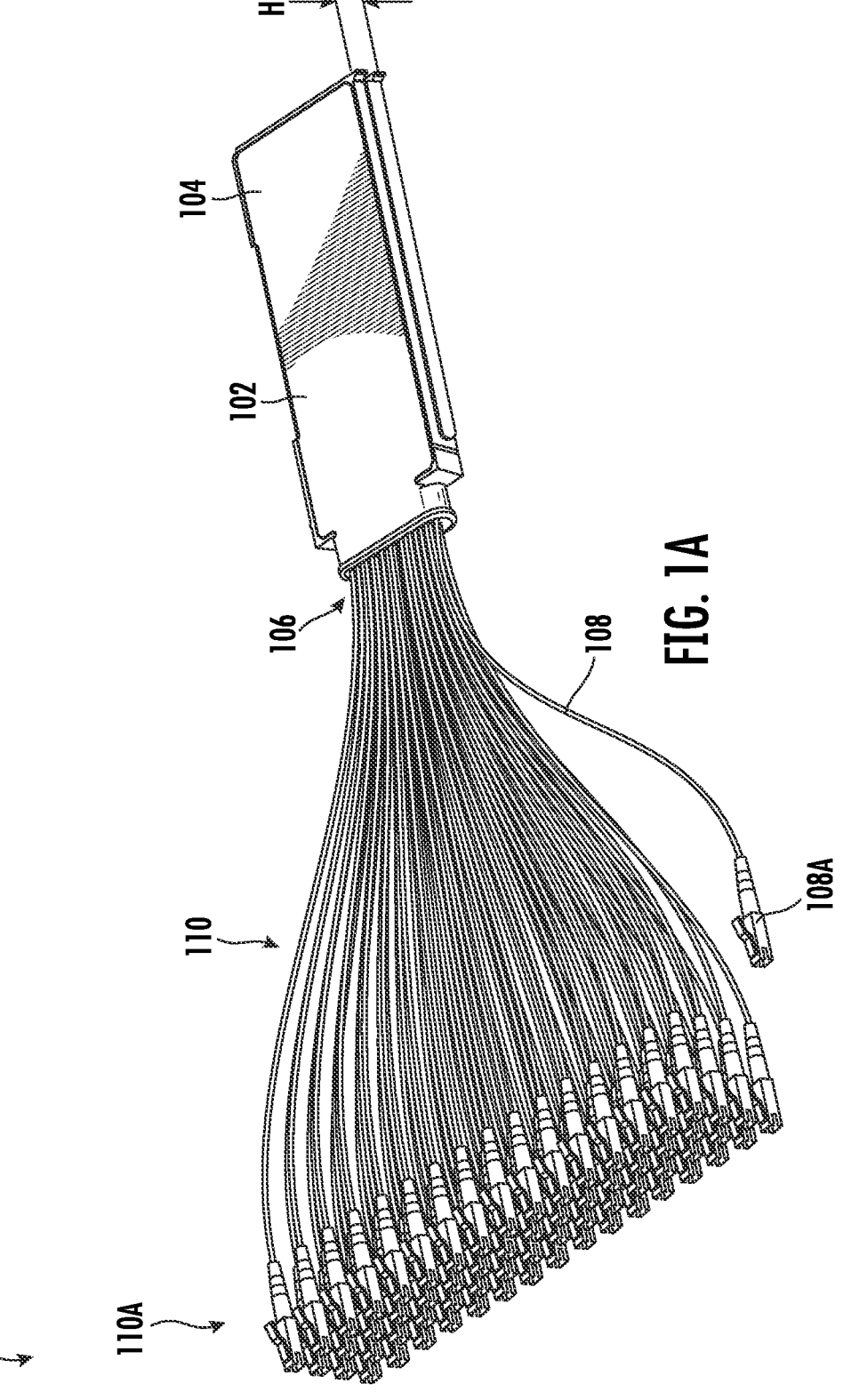
FIG. 1A is a perspective view illustrating an example optical splitter assembly, in accordance with some embodiments discussed herein.

The following description of the embodiments of the present invention is merely exemplary in nature and is in no way intended to limit the invention, its application, or uses. The following description is provided herein solely by way of example for purposes of providing an enabling disclosure of the invention but does not limit the scope or substance of the invention. With the exception of items illustrated in FIGS. 5 and 6, like numerals are intended to refer to the same or similar components (e.g. numerals 102, 202, 302, etc. each refer to an optical splitter module).

Various optical splitter assemblies are provided herein having optical splitter modules with high optical fiber densities. FIG. 1A-1I illustrate various features of an example optical splitter assembly 100. The optical splitter assembly 100 includes an optical splitter module 102, and this optical splitter module 102 includes a top cover 104. The optical splitter module 102 may comprise a housing having a volume. The optical splitter module 102 possesses a height (H1), and this height (H1) is approximately 0.40 inches in the illustrated embodiment. However, the height (H1) may possess other values. The optical splitter module 102 also possesses an exit cavity 106, and the exit cavity 106 allows a covered input optical fiber 108 and covered output optical fibers 110 to extend into the optical splitter module 102. The covered input optical fiber 108 may include an input connector 108A at an end of the covered input optical fiber 108, and the covered output optical fibers 110 may include output connectors 110A at the end of the covered output optical fibers 110.

Figure 1B:
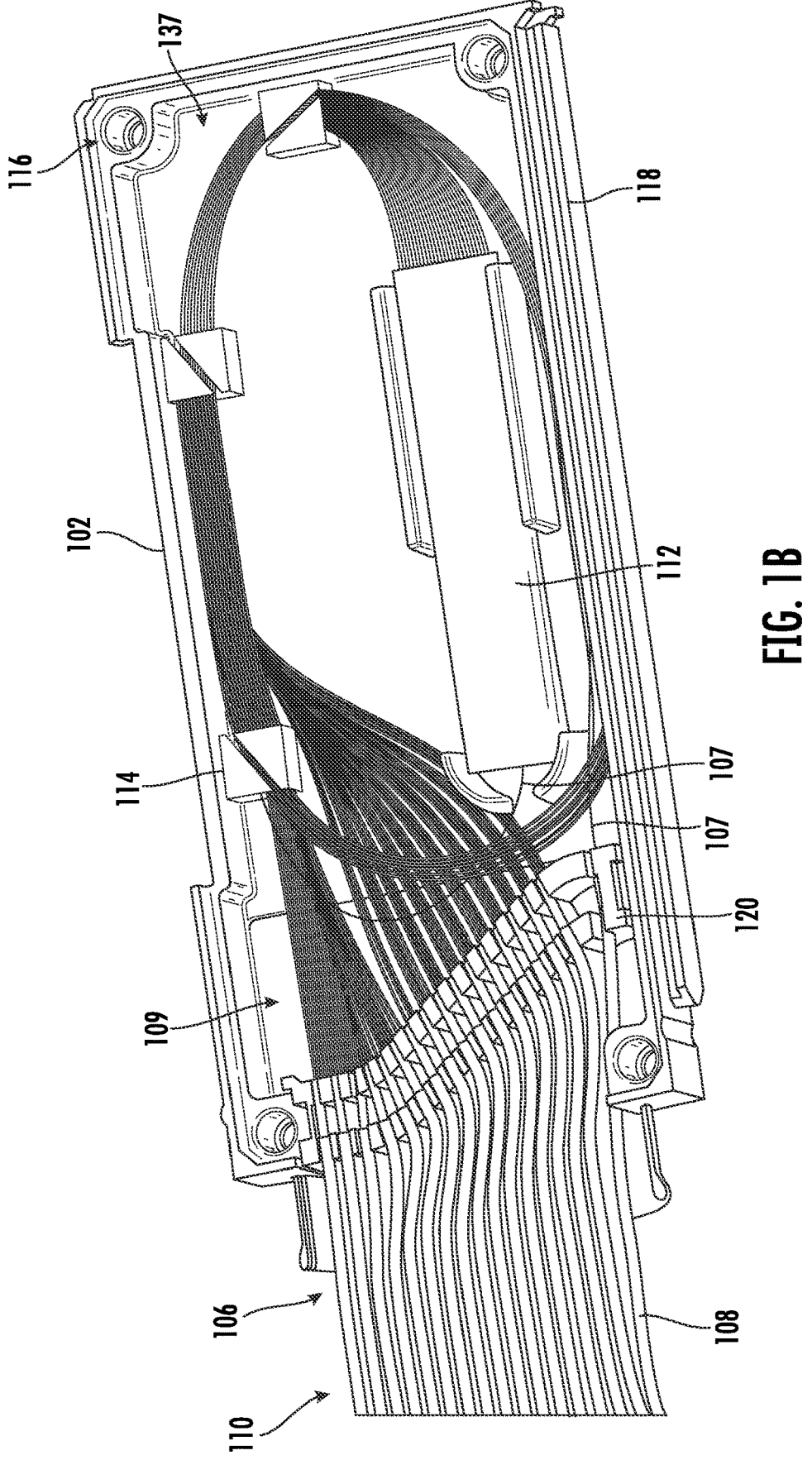
FIG. 1B is a perspective view illustrating various components installed within the optical splitter module of FIG. 1A, where a top cover of the optical splitter module is removed, in accordance with some embodiments discussed herein.
Figure 1C:
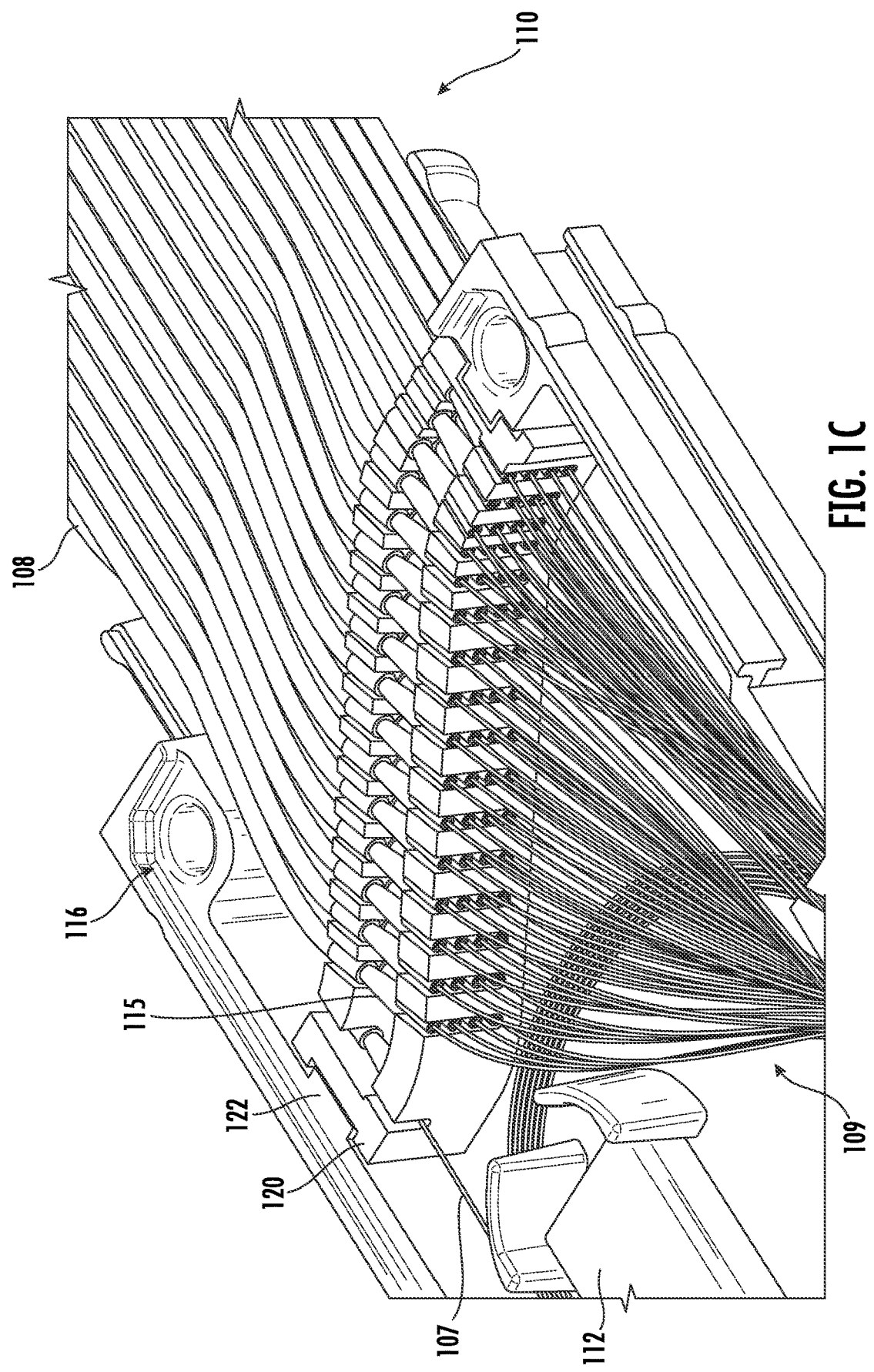
FIG. 1C is an enhanced perspective view illustrating example input optical fibers and output optical fibers installed in the fanout device, in accordance with some embodiments discussed herein.

FIG. 1B is a perspective view illustrating various components installed within the optical splitter module 102 of FIG. 1A where a top cover 104 (see FIG. 1A) of the optical splitter module 102 is removed. Additionally, FIG. 1C is an enhanced perspective view illustrating the input optical fiber 107 and the output optical fibers 109 installed in the fanout device 120. A splitter device 112, routing guides 114, and a fanout device 120 is provided in the optical splitter module 102. In some embodiments, the fanout device 120 may be integrally attached to the optical splitter module 102, but the fanout device 120 may be removably attachable to the optical splitter module 102 in other embodiments. The fanout device 120 may comprise a wide variety of materials. For example, the fanout device 120 may include a polymer material, a plastic material, or some other material. Protrusions within the optical splitter module 102 may assist in positioning the splitter device 112 in the appropriate position. The splitter device 112, the routing guides 114, and the fanout device 120 may be secured to the optical splitter module 102 in some embodiments. For example, the splitter device 112 may be secured to the optical splitter module 102 using fasteners such as adhesive, screws, snap fit tools, etc. The splitter device 112 may be configured to split an input signal from the input optical fiber 107 into a plurality of output signals that are each directed into one of the plurality of output optical fibers 109. In some embodiments, the input optical fiber 107 and the plurality of output optical fibers 109 may be bend insensitive fibers. The input optical fiber 107 and the plurality of output optical fibers 109 may possess a minimum bending radius of approximately 5 millimeters or less in some embodiments. Further, the input optical fiber 107 and the plurality of output optical fibers 109 may include bend performance fibers. The input optical fiber 107 and the plurality of output optical fibers 109 may include a bend performance fiber such as an ITU-T G.657.B3 fiber. The ITU-T G.657.B3 fiber has a minimum bending radius or a macro bend of approximately 5 millimeters (accounting for standard tolerances in measuring the minimum bending radius) and has an induced loss of ≤0.1 decibels per turn at a wavelength of 1550 nanometers.

In the illustrated embodiment, a covered input optical fiber 108 and covered output optical fibers 110 are illustrated. The covered input optical fiber 108 includes an input optical fiber 107 with protective tubing around the input optical fiber 107, and the covered output optical fibers 110 each include an output optical fiber 109 with protective tubing around the output optical fiber 109.

The covered input optical fiber 108 and the covered output optical fibers 110 extend from outside of the optical splitter module 102, through the exit cavity 106, and into the optical splitter module 102. The covered input optical fiber 108 and the covered output optical fibers 110 extend to the fanout device 120 and are retained in one of the first openings 124 (see FIG. 1G), the second openings 126 (see FIG. 1G), the third opening 128 (see FIG. 1G), or the fourth opening 130 (see FIG. 1G) of the fanout device 120. The protective tubing provided in the covered input optical fiber 108 and the covered output optical fibers 110 may be removed for portions of the fibers that are retained within the optical splitter module 102. Thus, the input optical fiber 107 and the output optical fibers 109 may be provided without any protective tubing in certain portions of the internal volume 137 of the optical splitter module 102. By doing so, the internal volume 137 required to hold the optical fibers may be reduced. Furthermore, removal of protective tubing may further reduce the minimum bending radius for the optical fibers, and this may also permit a reduction in the size of the internal volume 137 of the optical splitter module 102.

The input optical fiber 107 and the output optical fibers 109 may be routed within the internal volume 137 of the optical splitter module 102 using the routing guides 114. The routing guides 114 may comprise rubber material in some embodiments, but a wide variety of materials may be used for the routing guides 114. As illustrated, multiple routing guides 114 may be provided in the internal volume 137 of the optical splitter module 102 to route the fibers as desired.

The input optical fiber 107 and output optical fibers 109 are routed to the splitter device 112, and the fibers are connected to the splitter device 112. In the illustrated embodiment, one input optical fiber 107 and sixty-four (64) output optical fibers 109 are connected to the splitter device 112. The input optical fiber 107 may be configured to carry an input signal, and the output optical fibers 109 may each be configured to carry a respective output signal. The splitter device 112 is configured to split signals from the input optical fiber 107 into sixty-four (64) output optical fibers 109.

However, a different number of input optical fibers 107 and output optical fibers 109 may be used in other embodiments. For example, two or more input optical fibers 107 may be used in some embodiments, and thirty-two (32), eighty (80), one hundred twenty-eight (128), or some other number of output optical fibers 109 may be used.

In some embodiments, a splitter device may be configured to split signals from a single input optical fiber into one hundred twenty-eight (128) output optical fibers. Where this is the case, the dimensions of the optical splitter module and the exit cavity may be increased to accommodate the increased number of output optical fibers. For example, the width (W1) (see FIG. 1E) of the optical splitter module and the width (A) (see FIG. 1F) of the exit cavity may be doubled in some embodiments. Alternatively, the height (H1) (see FIG. 1A) of the optical splitter module and the height (B) (see FIG. 1F) of the exit cavity may be doubled in some embodiments. However, the size of the optical splitter module may be increased in other ways, or the design of the optical splitter module may be modified in other ways to accommodate the increased number of output optical fibers.

Other features of the optical splitter module 102 are also illustrated in FIG. 1B. One or more guide holes 116 may be provided in the optical splitter module 102. In the illustrated embodiment, four guide holes 116 are provided. The guide holes 116 may be threaded holes in some embodiments. The guide holes 116 may assist in the positioning of the optical splitter module 102, and the guide holes 116 may permit the optical splitter module 102 to be easily secured to another device. Additionally, the optical splitter module 102 also includes a mount rail 118. In some embodiments, the mount rail 118 is configured to permit the optical splitter module 102 to engage with another optical splitter module. The mount rail 118 may be used in some embodiments to easily secure the optical splitter module 102 to some other device, such as within a corresponding slot or spot within an enclosure.

Additionally, the optical splitter module 102 may include one or more protrusions 122. In the illustrated embodiment of FIG. 1C, the optical splitter module 102 includes two protrusions 122. These protrusions 122 may be configured to engage with a respective recess 122A in a fanout device 120 as illustrated in FIG. 1D.

Figure 4:
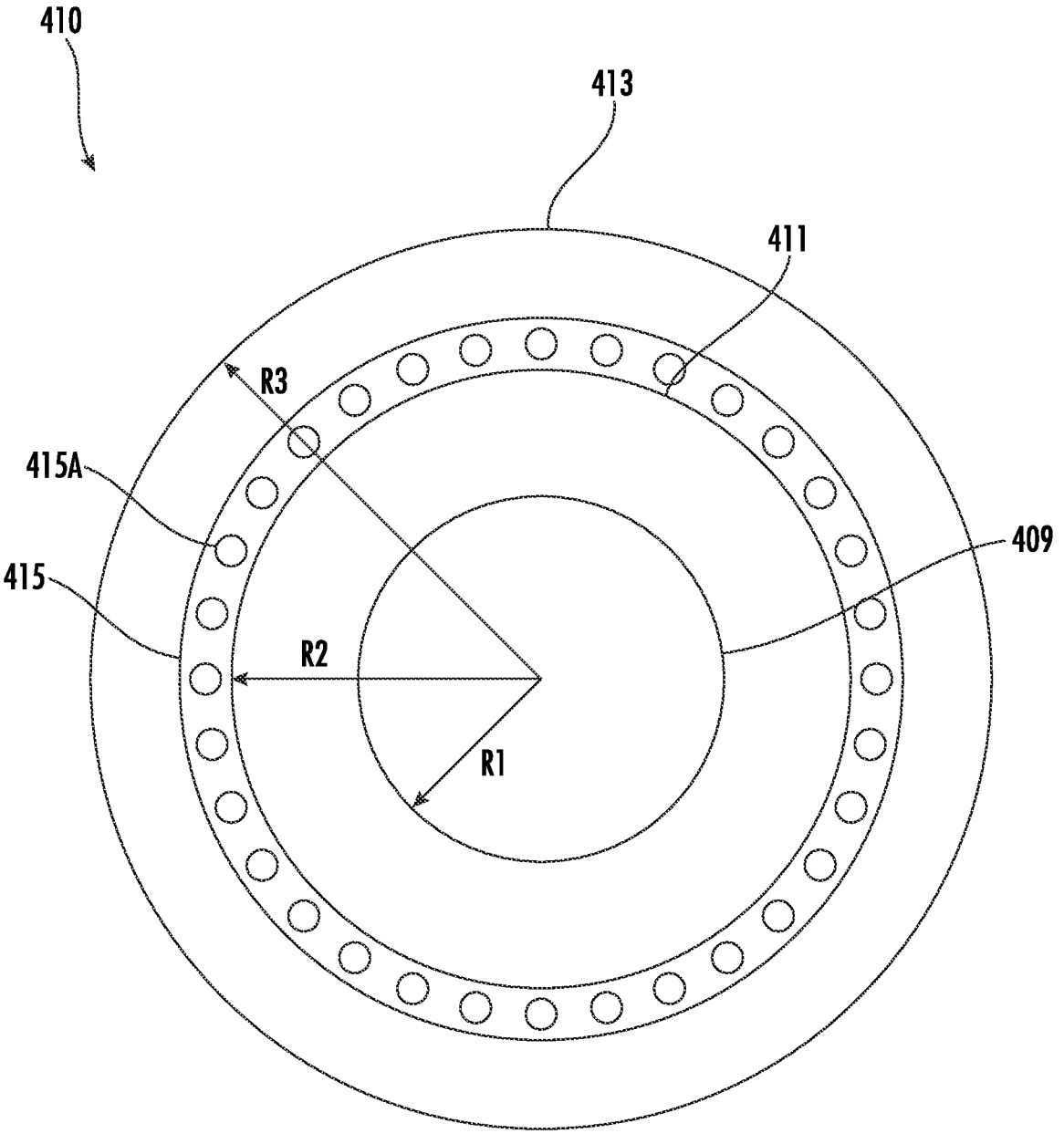
FIG. 4 is a schematic view illustrating an example cross-section of a covered output optical fiber, in accordance with some embodiments discussed herein.

Further details regarding the structure of covered optical fibers can be seen in FIG. 4. The covered input optical fibers 108, 208, 308 and the covered output optical fibers 110, 210, 310 presented in other embodiments may have a structure similar to the structure of the covered optical fibers 410 of FIG. 4. The covered optical fiber 410 may include an optical fiber 409 and protective tubing around the optical fiber 409. In the illustrated embodiment, two different layers of protective tubing are provided around the optical fiber 409, with inner tubing 411 and outer tubing 413 being provided. In the illustrated embodiment, the optical fiber 409, the inner tubing 411, and the outer tubing 413 may each possess a circular cross section, but other cross sectional shapes may also be used. The optical fiber 409 may possess a first radius (R1), and this first radius (R1) is 0.125 millimeters (0.0049 inches) in the illustrated embodiment. The inner tubing 411 may possess a second radius (R2), and this second radius (R2) is 0.45 millimeters (0.018 inches) in the illustrated embodiment. The outer tubing 413 may possess a third radius (R3), and this third radius (R3) is 0.80 millimeters (0.031 inches) in the illustrated embodiment. FIG. 4 is merely a schematic view that is provided for the purpose of explanation, and the illustration of the covered output optical fiber 410 in FIG. 4 is not necessarily drawn to scale. In the embodiment illustrated in FIG. 4, an aramid layer 415 is provided between the outer tubing 413 and the inner tubing 411. The aramid layer 415 comprises a plurality of individual aramid threads 415A. The aramid layer 415 and aramid threads 415A therein may be assist in forming a bond with an epoxy. In some embodiments, outer tubing 413 may be removed to expose the aramid layer 415, and aramid threads 415A within an aramid layer 415 may disperse and provide an increased surface area for the formation of bonds with an epoxy. The aramid layer 415 may provide increased strain relief for input and output optical fibers. This aramid layer 415 is illustrated as aramid layer 115 in FIG. 1C. The aramid material in the aramid layer 415 may provide increased strength without unduly increasing the weight of the covered input and output optical fibers.

Figure 1D:
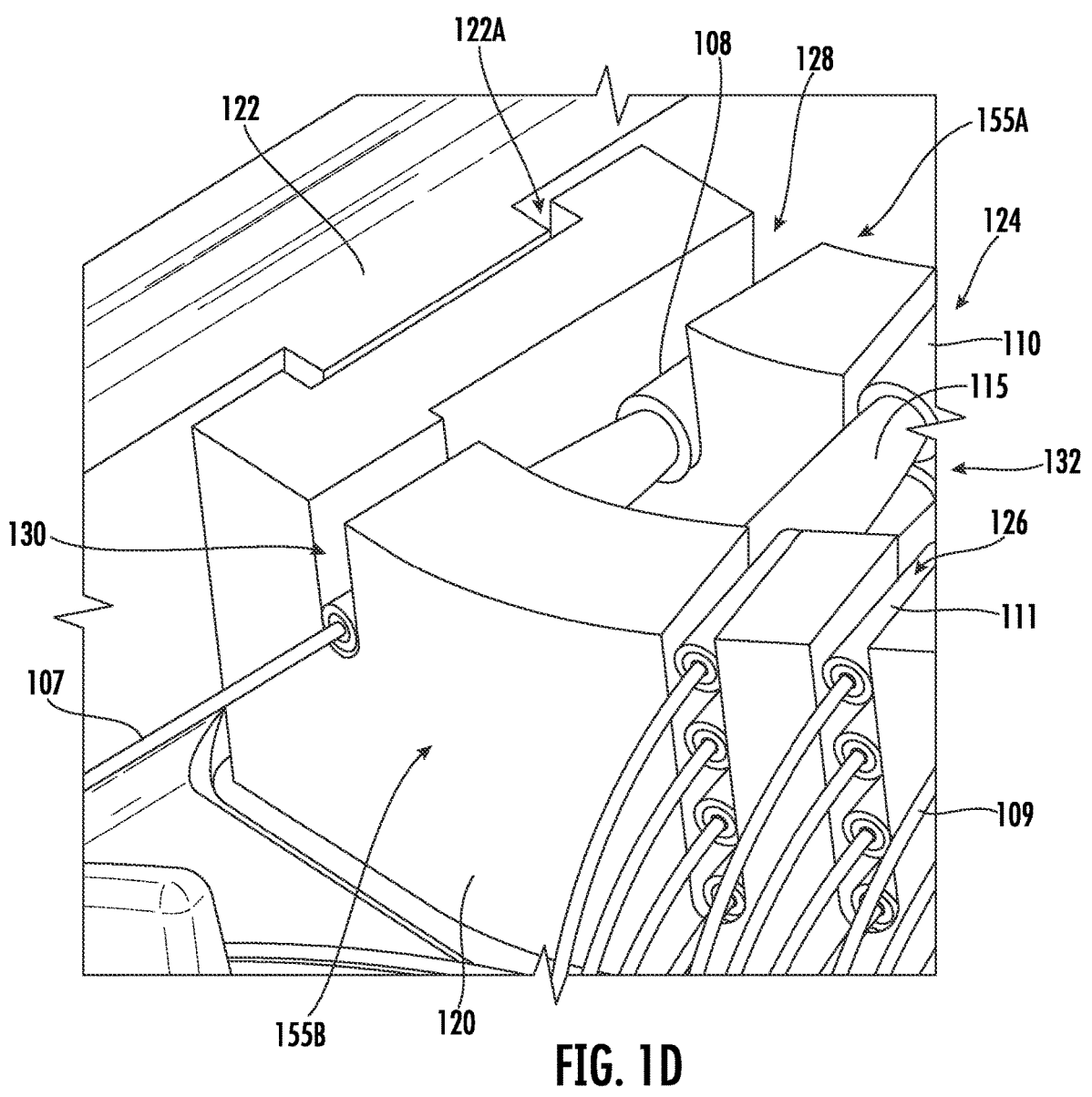
FIG. 1D is an enhanced perspective view illustrating example input and output optical fibers installed in the fanout device, in accordance with some embodiment discussed herein.
Figure 1E:
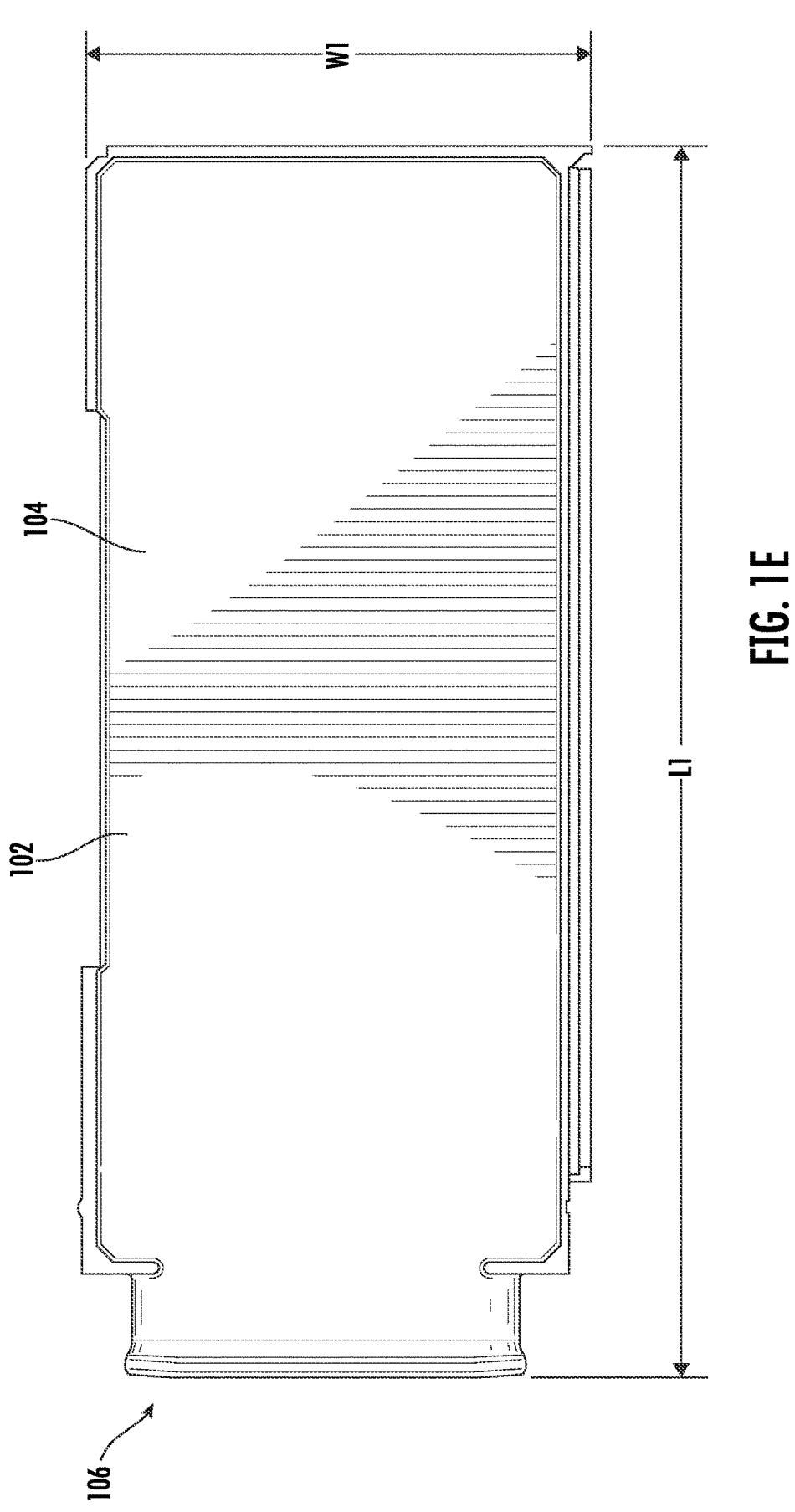
FIG. 1E is a top view illustrating the optical splitter module of FIG. 1A in isolation, in accordance with some embodiments discussed herein.
Figure 1F:
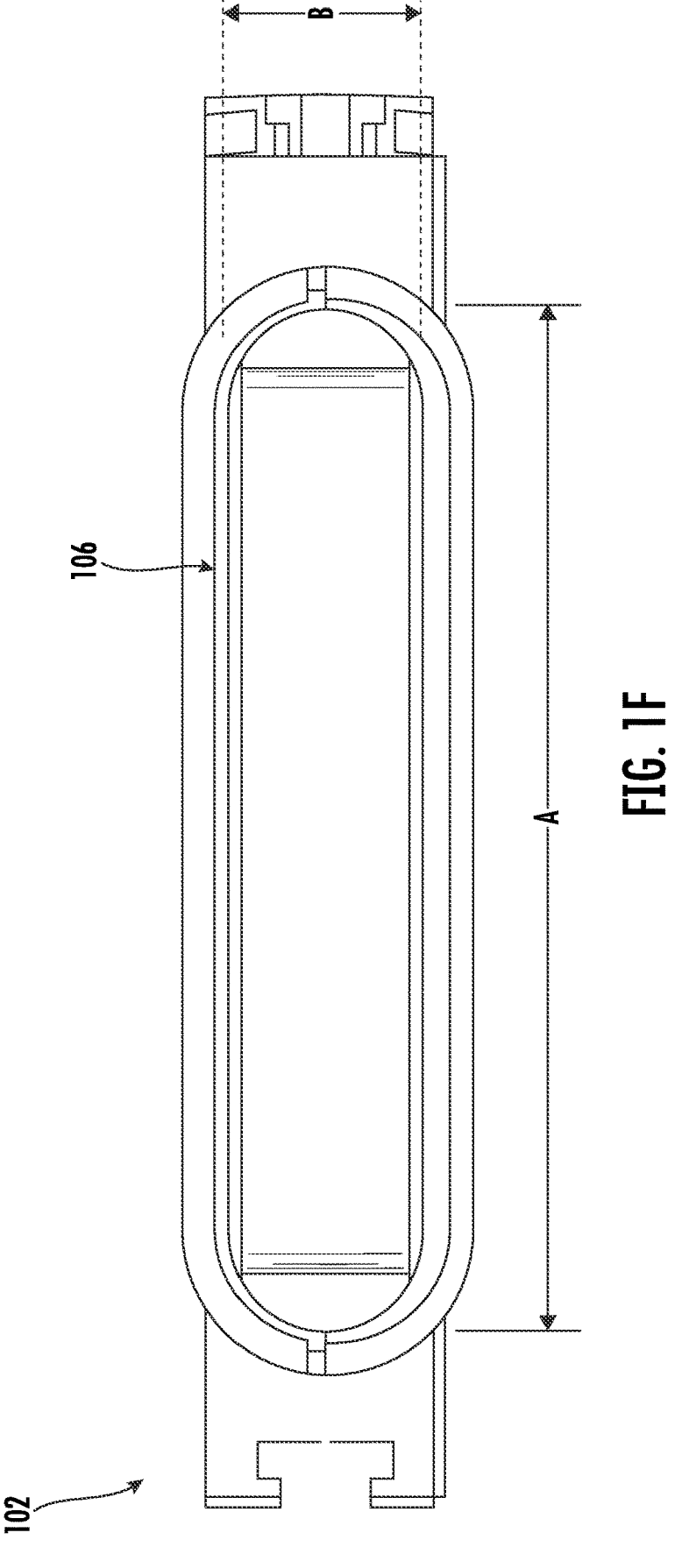
FIG. 1F is a front view illustrating the optical splitter module of FIG. 1A in isolation, in accordance with some embodiments discussed herein.
Figure 1G:
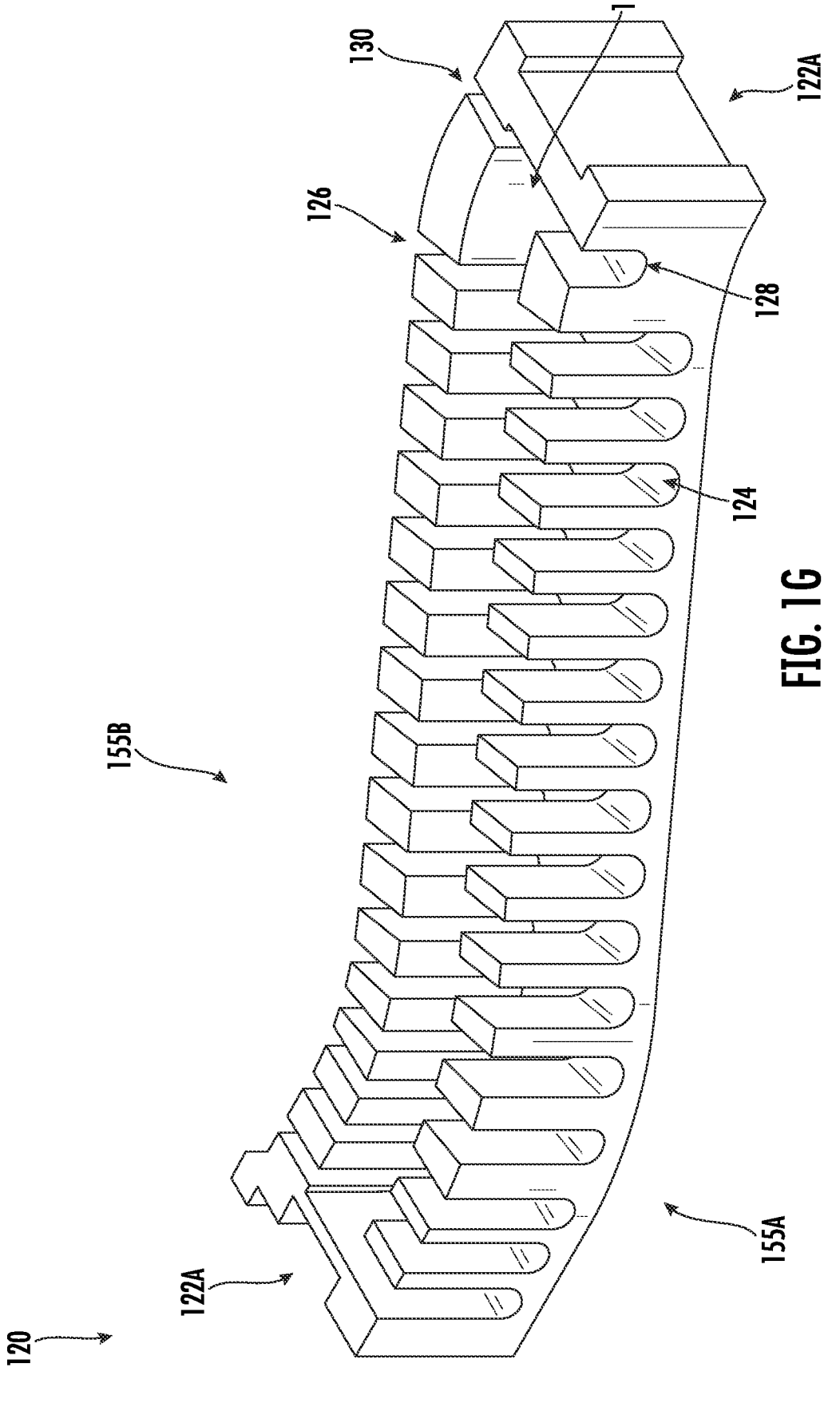
FIG. 1G is a perspective view illustrating the fanout device of FIG. 1B in isolation, in accordance with some embodiments discussed herein.

Further details regarding the operation of the fanout device 120 may be readily understood by viewing FIGS. 1D and 1G. FIG. 1D is an enhanced perspective view illustrating the input optical fiber 107 and the output optical fibers 109 installed in the fanout device 120. FIG. 1G is a perspective view illustrating the fanout device 120 in isolation.

The fanout device 120 may possess openings having a variety of sizes. In the fanout device 120, first openings 124 and second openings 126 are provided. The first openings 124 may be provided at various positions along an externally facing side 155A (see FIG. 1D) of the fanout device 120, and the first openings 124 may be configured to receive covered output optical fibers 110. The second openings 126 may be provided at various positions along an internally facing side 155B (see FIG. 1D) of the fanout device 120, and the second openings 126 may be configured to receive output optical fibers 109 with some or all protective tubing removed. The first openings 124 and the second openings 126 may be configured to vertically receive three or more output optical fibers 109, and these output optical fibers 109 may possess protective tubing when received in the first openings 124 and the second openings 126. In the illustrated embodiment in FIG. 1D, the first openings 124 and the second openings 126 are each configured to receive four output optical fibers 109 that have protective tubing around the optical fibers.

In the illustrated embodiment, outer tubing 413 (see FIG. 4) of the covered output optical fiber 110 may come in contact with the sidewalls that form a first opening 124. This contact generates friction on the covered output optical fiber 110 and assists in providing strain relief for the covered output optical fiber 110. Additionally, at each of the second openings 126, inner tubing 111 of the covered output optical fiber 110 may come in contact with the sidewalls that form the second opening 126. This contact generates friction on the inner tubing 111 and assists in providing strain relief for an output optical fiber 109. By providing strain relief, the amount of strain on the output optical fiber 109 within the protective tubing may be reduced.

In the fanout device 120 of FIG. 1D, a third opening 128 and a fourth opening 130 are provided as well. The third opening 128 may be provided at an externally facing side 155A of the fanout device 120, and the third opening 128 may be configured to receive a covered input optical fiber 108. The fourth opening 130 may be provided at an internally facing side 155B of the fanout device 120, and the fourth opening 130 may be configured to receive an input optical fiber 107 with some or all protective tubing removed.

In the illustrated embodiment, outer tubing 413 (see FIG. 4) of the covered input optical fiber 108 may come in contact with the sidewalls that form the third opening 128. This contact generates friction on the covered input optical fiber 108 and assists in providing strain relief for the input optical fiber 107. Additionally, at the fourth opening 130, inner tubing 411 (see FIG. 4) of the covered input optical fiber 108 comes in contact with the sidewalls that form the fourth opening 130. This contact generates friction on the inner tubing 411 (see FIG. 4) and assists in providing strain relief for the input optical fiber 107. By providing strain relief, the amount of strain on the input optical fiber 107 within the protective tubing may be reduced.

Other features of the fanout device 120 may also be easily viewed in FIG. 1D. For example, the fanout device 120 may define a recess 122A, such as at both ends of the fanout device 120. The recess 122A may be configured to receive a protrusion 122 within the optical splitter module 102, and this engagement may at least partially restrict the movement of the fanout device 120. In the embodiment illustrated in FIG. 1D, the recess 122A and the protrusion 122 are provided to enable the fanout device 120 to be removably attachable to the optical splitter module 102. However, in other embodiments, the fanout device 120 may be integrally attached to the optical splitter module 102.

Furthermore, the fanout device 120 may define an internal cavity 132 in the central portions of the fanout device 120. After some or all of the input optical fibers and output optical fibers have been positioned in openings of the fanout device 120, epoxy may be added in the internal cavity 132 to at least partially restrict the movement of the optical fibers in the internal cavity 132.

Further measurements of the optical splitter module 102 are illustrated in FIG. 1E. FIG. 1E is a top view illustrating the optical splitter module 102 of FIG. 1A in isolation. As illustrated, the optical splitter module 102 may have a width (W1) and a length (L1). The width (W1) may take a variety of values, but the width (W1) is 2.30 inches in the optical splitter module 102 of FIG. 1E. Additionally, the length (L1) may take a variety of values, but the length (L1) is 5.12 inches in the optical splitter module 102 of FIG. 1E. A top cover 104 is also illustrated in FIG. 1E. This top cover 104 may be removed as illustrated in FIG. 1B to expose the internal volume 137 of the optical splitter module 102.

Further measurements of the exit cavity 106 for the optical splitter module 102 are illustrated in FIG. 1F. The exit cavity 106 possess a width (A). The width (A) is 1.68 inches in the illustrated embodiment, but other values may be used. Additionally, the exit cavity 106 may possess a height (B). The height (B) is 0.32 inches in the illustrated embodiment, but other values may be used for the height (B). The exit cavity 106 may have an area of approximately 0.52 inches squared or less.

The optical splitter module 102 may have a small volume and a large split density. The "split density" is defined herein as the number of output optical fibers in the optical splitter module divided by a number of input optical fibers in the optical splitter module as well as a volume of the optical splitter module. In various embodiments described herein the split density of the optical splitter modules is greater than 5 splits per cubic inch. In the illustrated embodiments of FIGS. 1A-1F, the split density of the optical splitter module 102 is approximately 13.6 splits per cubic inch (64 output optical fibers/(1 input optical fiber×4.7 cubic inches)). However, the split density of the optical splitter module 102 may be increased even further by making further modifications to the geometry and/or design of the optical splitter module 102. By providing an optical splitter module having a high split density, the volume of the optical splitter module may be reduced while still permitting a high number of optical fibers to be received within the optical splitter module. A high split density permits a larger service area to be provided without the need for more or larger transmission equipment in a central office.

Figure 1H:
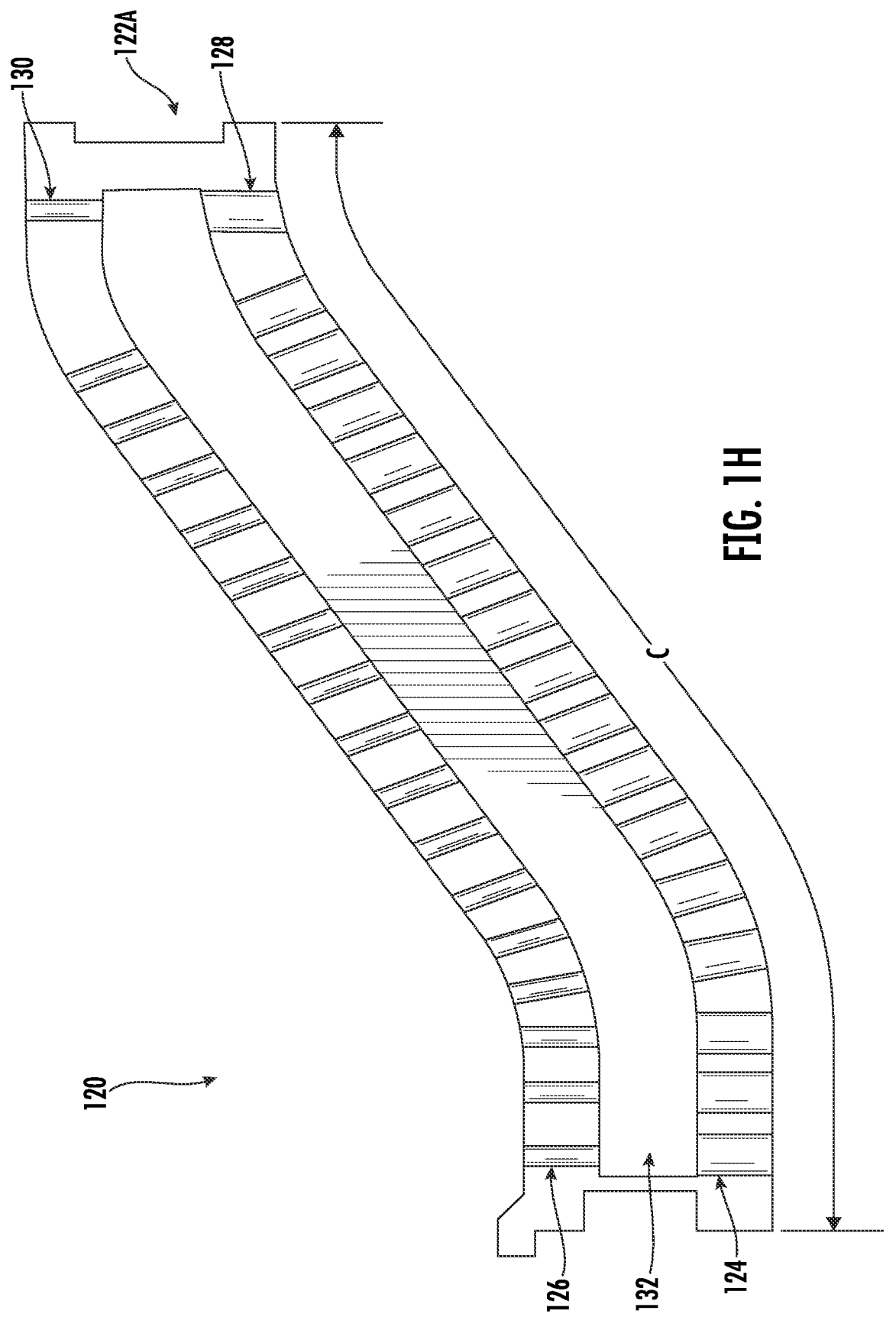
FIG. 1H is a top view illustrating the fanout device of FIG. 1G in isolation, in accordance with some embodiments discussed herein.
Figure 1I:
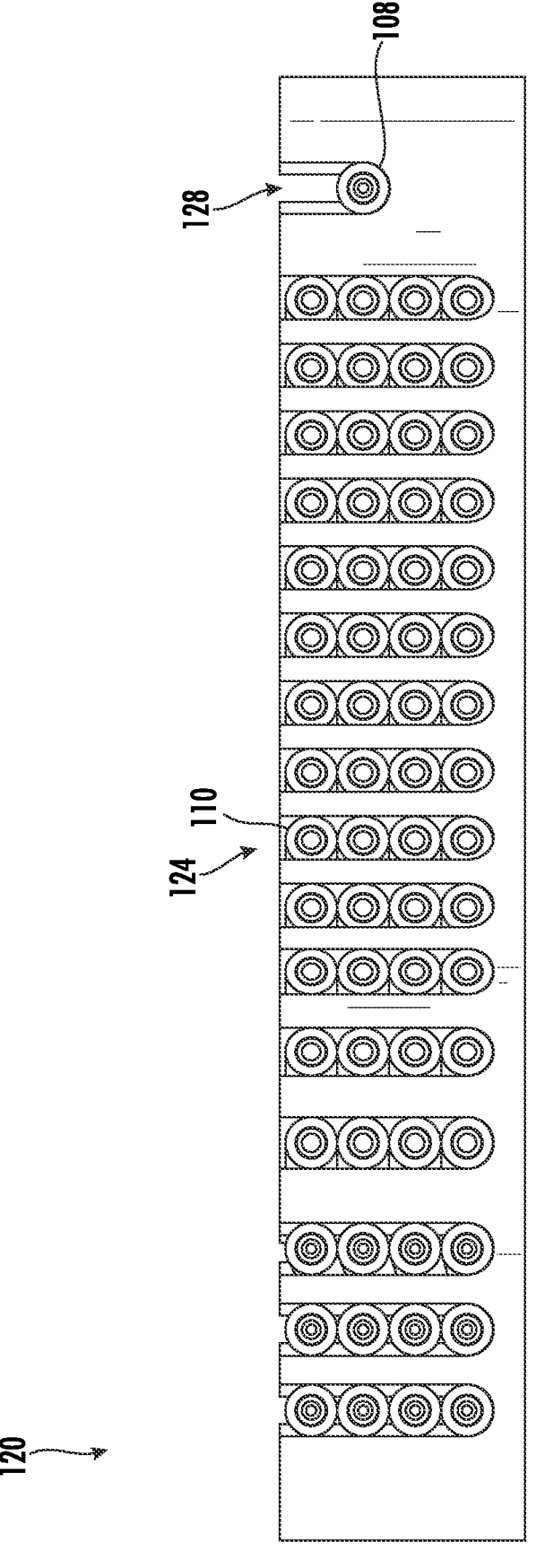
FIG. 1I is a front view illustrating the fanout device of FIG. 1G with covered optical fibers provided therein, in accordance with some embodiments discussed herein.

Additionally, FIGS. 1H and 1I provide other views illustrating the operation of the fanout device 120. FIG. 1H provides a top view illustrating the fanout device 120 while FIG. 1I provides a front view illustrating the fanout device 120. As illustrated in FIG. 1H, the fanout device 120 has a side length (C). The side length (C) is approximately 1.99 inches in the illustrated fanout device 120, but other side lengths (C) may be used. The side length (C) may extend along the curved side surface of the fanout device 120. While the side length (C) is measured along the externally facing side 155A (see FIG. 1D) of the fanout device 120, side length (C) may be measured along the internally facing side 155B (see FIG. 1D) of the fanout device 120 in some embodiments. The side length (C) is greater than the width (A) of the exit cavity 106, and the side length (C) may even be greater than the width (W1) of the optical splitter module 102. As a result, an increased number of openings 124, 126 may be provided, and this increase in the number of openings 124, 126 may permit an increased number of output optical fibers 109 to be received in the fanout device 120 and the optical splitter module 102.

The increased side length (C) of the fanout device 120 may be provided in a variety of ways. The fanout device 120 may be provided with a non-linear shape. For example, the fanout device 120 of FIG. 1H has a non-linear shape, with the fanout device 120 being curved. The fanout device 120 may have other non-linear shapes in other embodiments. For example, the fanout device 120 may extend in multiple straight sections at different angles, the fanout device 120 may extend in other curved shapes, etc. Additionally, the fanout device 120 may extend diagonally within the optical splitter module 102 (e.g., with respect to the exit cavity) in some embodiments.

Looking now at FIG. 1I, covered optical fibers are illustrated within the fanout device 120. FIG. 1I is a front view illustrating the fanout device 120. A plurality of first openings 124 are illustrated with covered output optical fibers 110 being provided therein. Furthermore, a third opening 128 is illustrated with a covered input optical fiber 108 being provided therein.

Figure 1J:
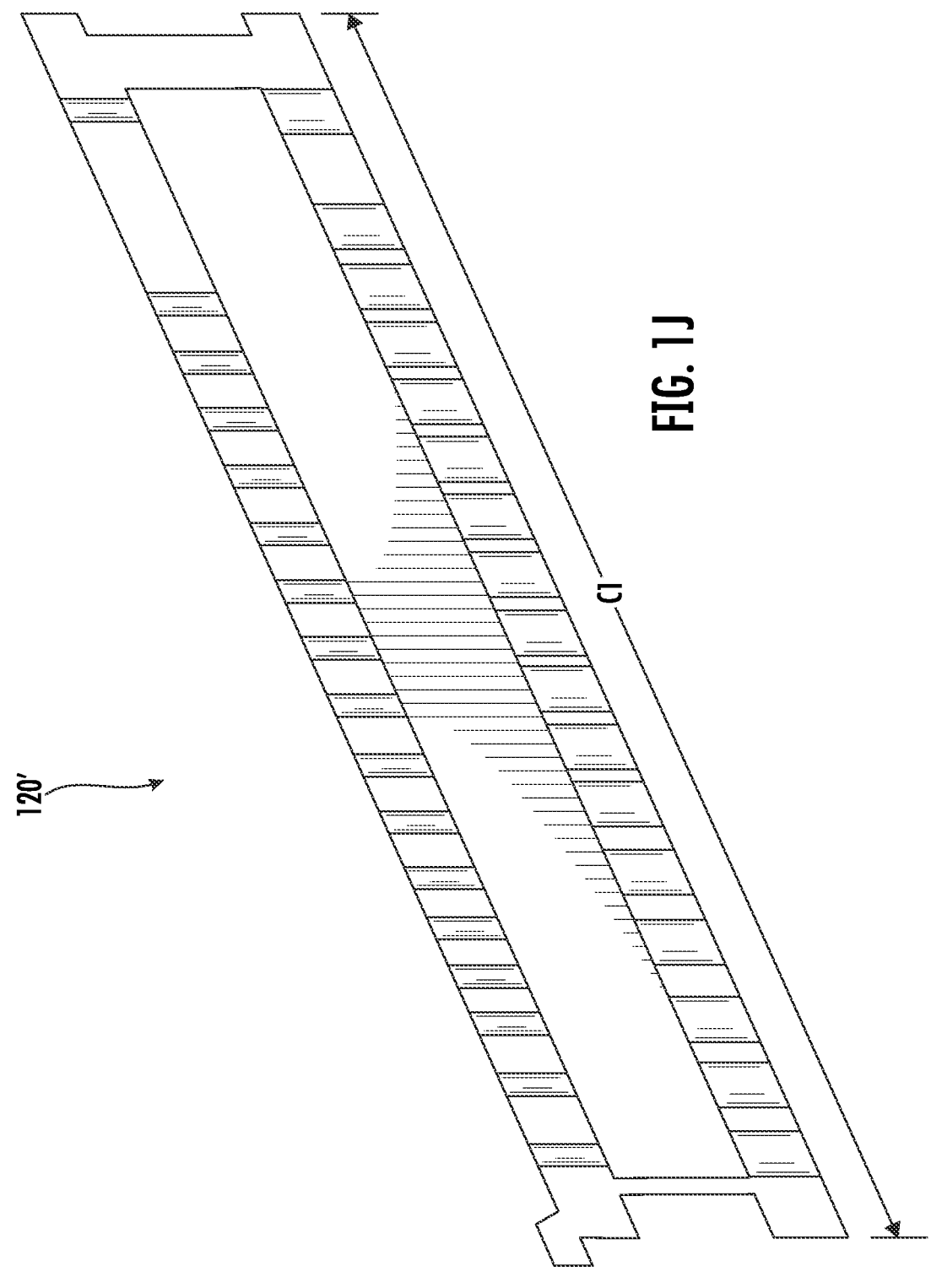
FIG. 1J is a top view illustrating another example fanout device in isolation, in accordance with some embodiments discussed herein.

Additionally, some fanout devices may be provided that are configured to extend diagonally within the optical splitter module 102. For example, FIG. 1J illustrates another example fanout device 120' with sides that extend linearly. The side length (C1) of the fanout device 120' may still be greater than the width (A) of any exit cavity 106.

While FIGS. 1A-1I illustrate one example embodiment of an optical splitter module, other optical splitter modules are contemplated having an even smaller footprint. These smaller optical splitter modules may provide an increased split density relative to the optical splitter module of FIGS. 1A-1I. An example of a smaller optical splitter module is illustrated in FIGS. 2A-2C.

Figure 2A:
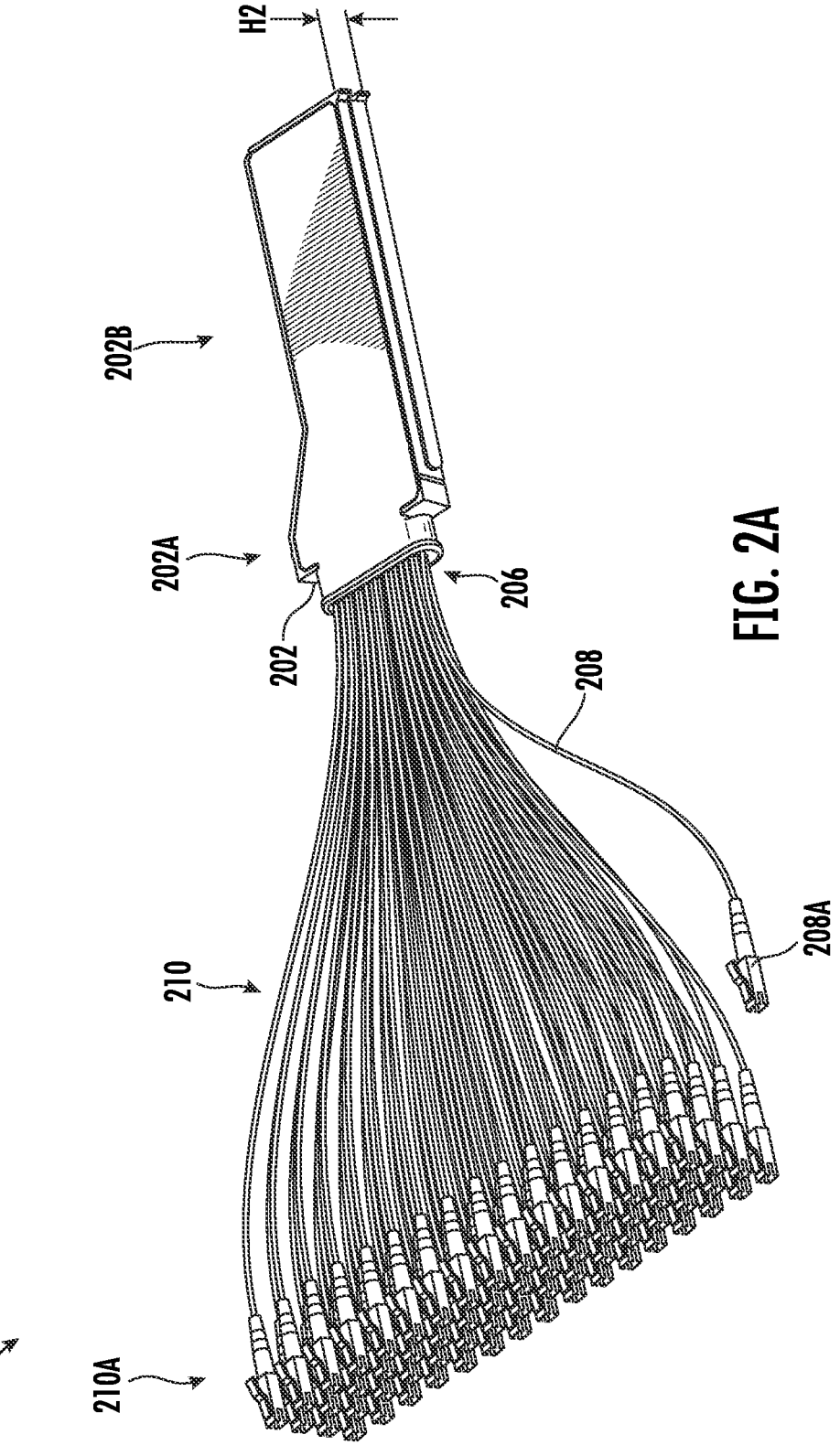
FIG. 2A is a perspective view illustrating another optical splitter assembly with an optical splitter module having reduced volume, in accordance with some embodiments discussed herein.
Figure 2B:
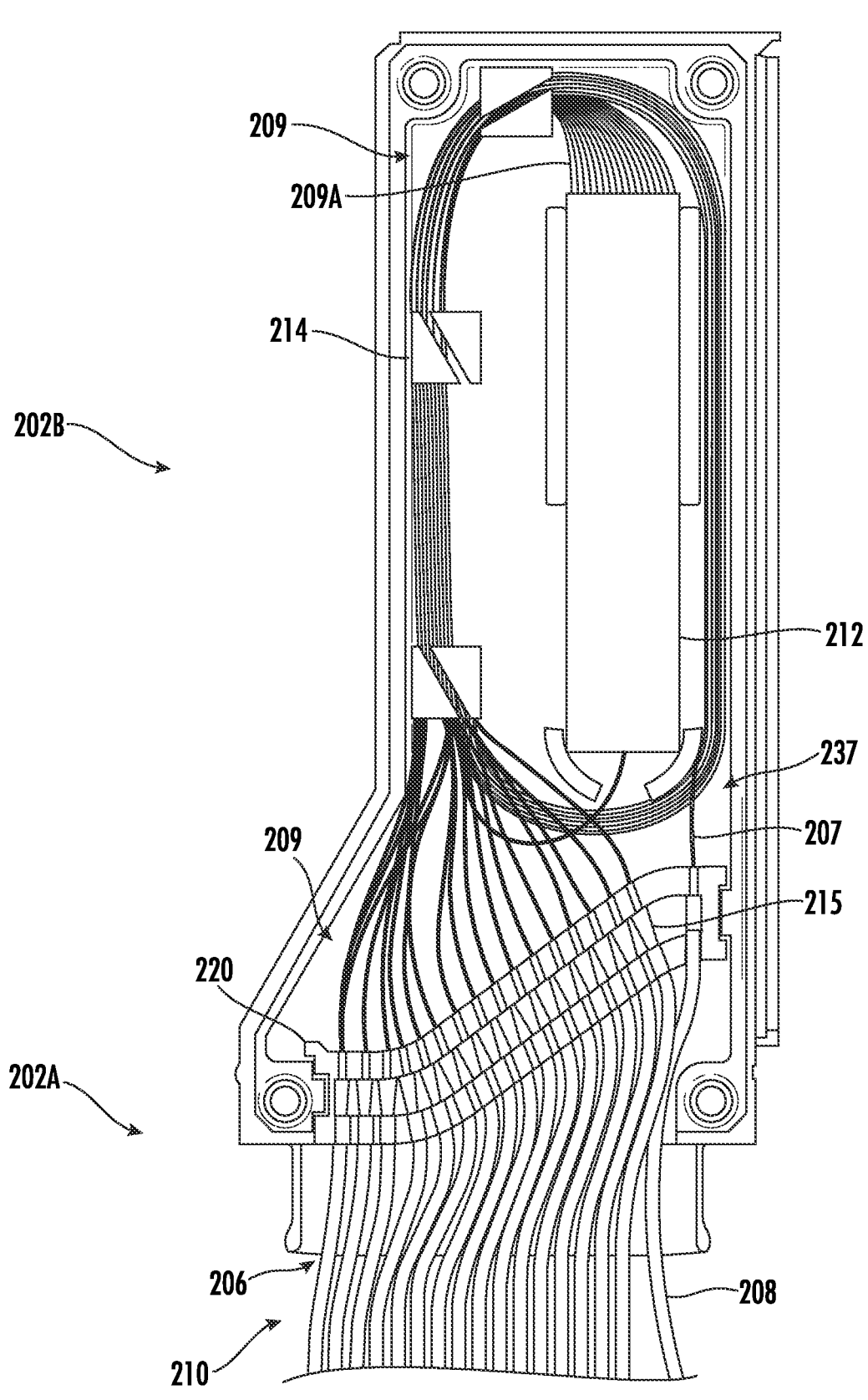
FIG. 2B is a top view illustrating various components installed within the optical splitter module of FIG. 2A where a top cover of the optical splitter module is removed, in accordance with some embodiments discussed herein.

FIG. 2A is a perspective view illustrating an example optical splitter assembly 200 where an optical splitter module 202 having a reduced footprint is utilized. The optical splitter module 202 has a first portion 202A and a second portion 202B. The first portion 202A is provided proximate to the exit cavity 206, and the second portion 202B is provided a distance away from the exit cavity 206. The first portion 202A may possess an increased width as compared to the second portion 202B.

The optical splitter module 202 may possess an exit cavity 206, and the exit cavity 206 allows a covered input optical fiber 208 and covered output optical fibers 210 to extend into the optical splitter module 202. The covered input optical fiber 208 may include an input connector 208A at an end of the covered input optical fiber 208, and the covered output optical fibers 210 may include output connectors 210A at the end of the covered output optical fibers 210.

Figure 2C:
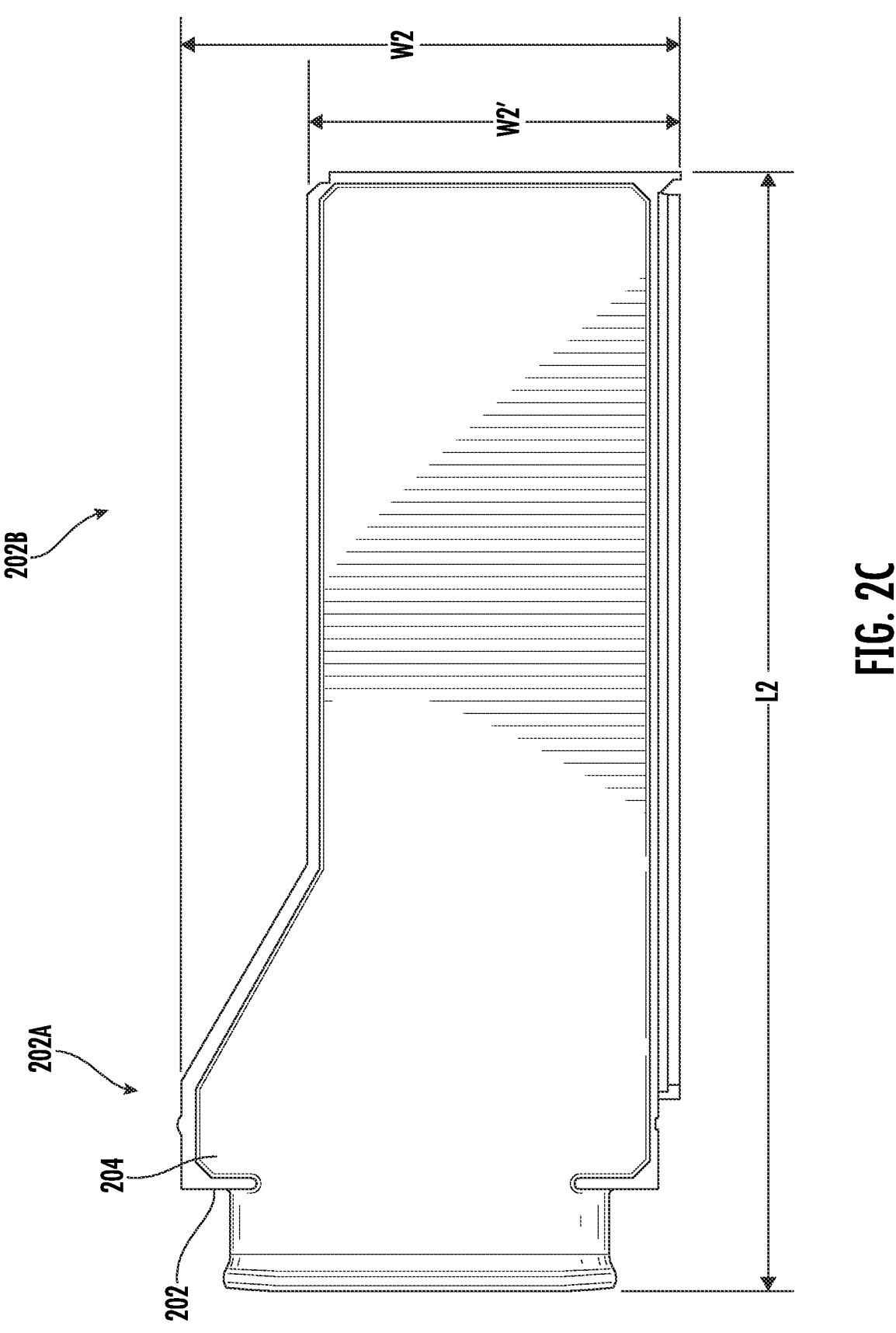
FIG. 2C is a top view illustrating an example optical splitter module, in accordance with some embodiments discussed herein.

Various measurements of the optical splitter module 202 are illustrated in FIGS. 2A and 2C. As illustrated in FIG. 2A, the optical splitter module 202 may have a height (H2). This height (H2) is 0.40 inches for the illustrated optical splitter module 202. As illustrated in FIG. 2C, the first portion 202A has a width (W2), and the second portion 202B has a width (W2'). In the optical splitter module 202 of FIGS. 2A-2C, the width (W2) is 2.30 inches and the width (W2') is 1.70 inches. The optical splitter module 202 may have an overall volume of approximately 3.7 cubic inches.

The minimum possible size of the width (W2') of the second portion 202B is dependent on the minimum bend radius of the output optical fibers 209 that extend from the splitter device 212. Looking at FIG. 2B, the leftmost output optical fiber 209A that is connected to the splitter device 212 has the smallest bend radius of all of the output optical fibers 209, and the width (W2') is sufficiently large to prevent the bend radius of the leftmost output optical fiber 209A from falling below its minimum bend radius—to the extent that the bend radius of an output optical fiber 209 falls below its minimum bend radius, damage may occur to the output optical fiber 209. Additionally, as illustrated in FIG. 2C, the first portion 202A may have a length (L2), and this length (L2) is 5.12 inches in the illustrated embodiment. However, each of these measurements for the optical splitter module 202 may have different values in other embodiments. Additionally, the exit cavity 206 may possess measurements similar to the exit cavity 106 of FIG. 1F.

In the illustrated embodiments of FIGS. 2A-2C, the split density of the optical splitter module 202 is approximately 17.3 splits per cubic inch (64 output optical fibers/(1 input optical fiber×3.7 cubic inches)). However, the split density of the optical splitter module 202 may be increased even further by making further modifications to the geometry and/or design of the optical splitter module 202.

Various components in the internal portions of the optical splitter module 202 are illustrated in FIG. 2B. FIG. 2B is a top view of the optical splitter module 202 of FIG. 2A where a top cover 204 (see FIG. 2C) of the optical splitter module 202 is removed.

The covered input optical fiber 208 and the covered output optical fibers 210 extend through the exit cavity 206 and into the optical splitter module 202. The covered input optical fiber 208 and the covered output optical fibers 210 extend to the fanout device 220 and are retained in openings of the fanout device 220. The fanout device 220 may be provided at a first portion 202A of the optical splitter module 202, and this may allow the fanout device 220 to maintain an increased size because the first portion 202A has a larger width than the second portion 202B. The protective tubing provided in the covered input optical fiber 208 and the covered output optical fibers 210 may be removed for portions of the optical fibers that will be retained within the optical splitter module 202. Thus, the input optical fiber 207 and the output optical fibers 209 may be provided without any protective tubing in certain portions of the internal volume 237 of the optical splitter module 202. By doing so, the size of the internal volume 237 required to hold the optical fibers may be reduced. Furthermore, removal of protective tubing may further reduce the minimum bending radius for the optical fibers, and this may also permit a reduction in the size of the internal volume 237 of the optical splitter module 202 at the second portion 202B. The input optical fiber 207 and the output optical fibers 209 may be routed within the internal volume 237 of the optical splitter module 202 using the routing guides 214. Aramid layers 215 may be provided in the covered input optical fiber 208 and the covered output optical fibers 210 as illustrated in FIG. 2B.

The input optical fiber 207 and output optical fibers 209 are routed to the splitter device 212, and these optical fibers are connected to the splitter device 212. In the illustrated embodiment, one input optical fiber 207 and sixty-four (64) output optical fibers 209 are connected to the splitter device 212, and the splitter device 212 is configured to split signals from the input optical fiber 207 into the sixty-four (64) output optical fibers 209. However, a different number of input optical fibers 207 and output optical fibers 209 may be used in other embodiments.

In the optical splitter assembly 100 of FIGS. 1A-1I and the optical splitter assembly 200 of FIGS. 2A-2C, a fanout device 120, 220 is provided within the optical splitter module 102, 202. However, additionally or alternatively, in other embodiments, an external fanout device may be provided that is not retained in an optical splitter module. By providing the external fanout device outside of the optical splitter module, the size of the optical splitter module may be reduced even further.

FIGS. 3A-3F illustrate an example embodiment where an external fanout device 334 is utilized. Starting with FIG. 3A, a perspective view is provided illustrating an optical splitter assembly 300 having multiple external fanout devices 334. As illustrated, the optical splitter assembly 300 has an optical splitter module 302. This optical splitter module 302 has a length (L3), and this length (L3) is 3.35 inches in the illustrated embodiment. The optical splitter module 302 also has a width (W3), and this width (W3) is 0.96 inches in the illustrated embodiment. The optical splitter module 302 also has a height (H3), and this height (H3) is 0.55 inches in the illustrated embodiment. The length (L3), the width (W3), and the height (H3) may possess different values in other embodiments. The optical splitter module 302 has a volume of approximately 1.77 cubic inches. In the illustrated embodiments of FIGS. 3A-3D, the split density of the optical splitter module 302 is approximately thirty-six (36) splits per cubic inch (64 output optical fibers/(1 input optical fiber×1.77 cubic inches)). However, the split density of the optical splitter module 302 may be increased even further by making further modifications to the geometry and/or design of the optical splitter module 302.

Figure 3A:
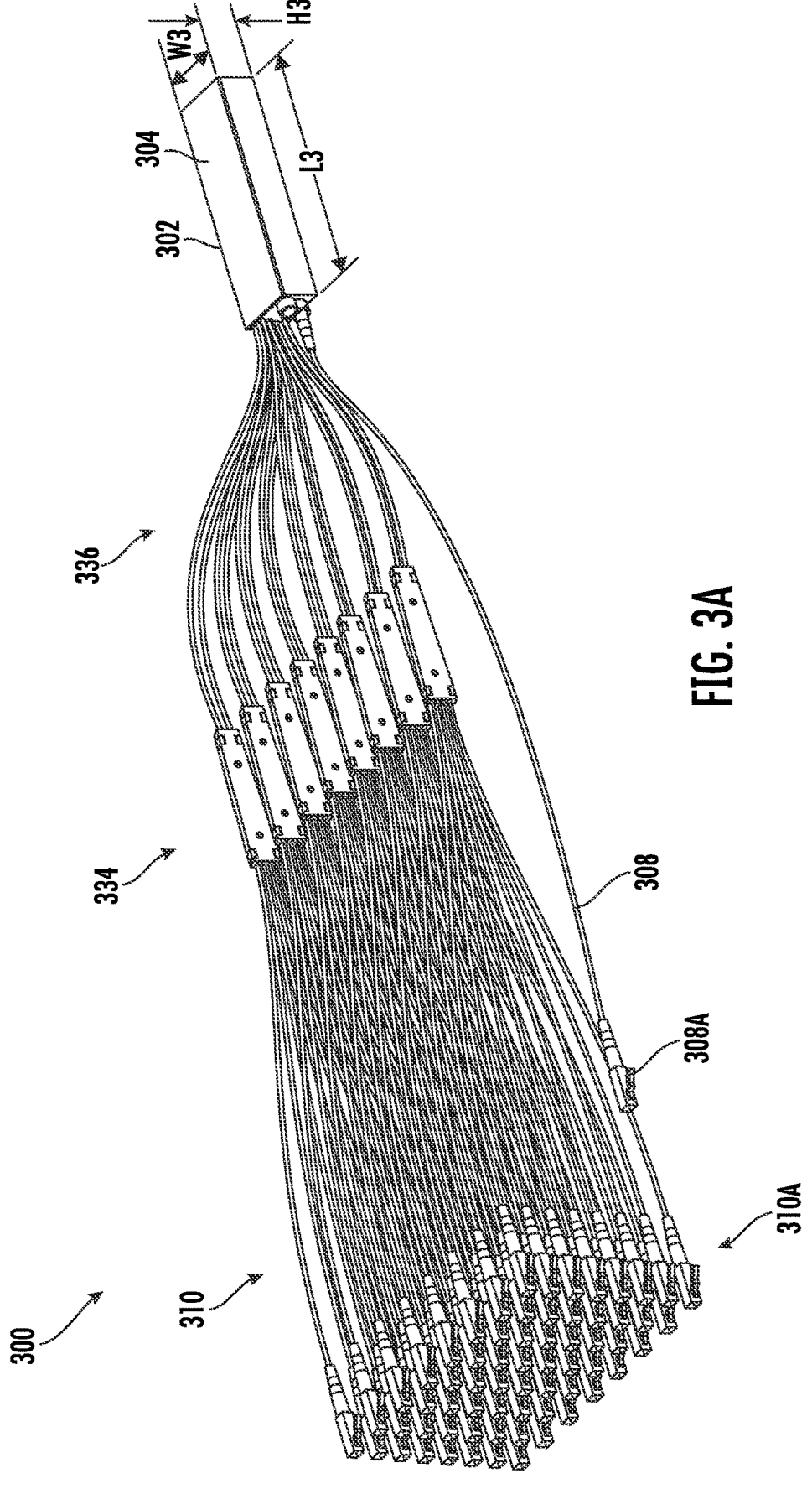
FIG. 3A is a perspective view illustrating another example optical splitter assembly having external fanout devices, in accordance with some embodiments discussed herein.

As illustrated in FIG. 3A, a covered input optical fiber 308 and one or more fiber ribbons 336 may exit out of the optical splitter module 302. The fiber ribbons 336 may include two or more output optical fibers retained within the fiber ribbons 336. In the illustrated embodiment, eight output optical fibers are retained within each fiber ribbon 336, and eight fiber ribbons 336 are provided. Thus, a total of sixty-four (64) output optical fibers are provided within the fiber ribbons 336, and the fiber ribbons 336 may each extend from the optical splitter module 302 to a respective external fanout device 334. At the external fanout devices 334, the output optical fibers in the fiber ribbons 336 may be separated from each other, and individual covered output optical fibers 310 extend out of the external fanout devices 334. These individual covered output optical fibers 310 may be separated from each other so that each of them may move independently of the others. The covered output optical fibers 310 include output connectors 310A at the end of the covered output optical fibers 310.

Figure 3B:
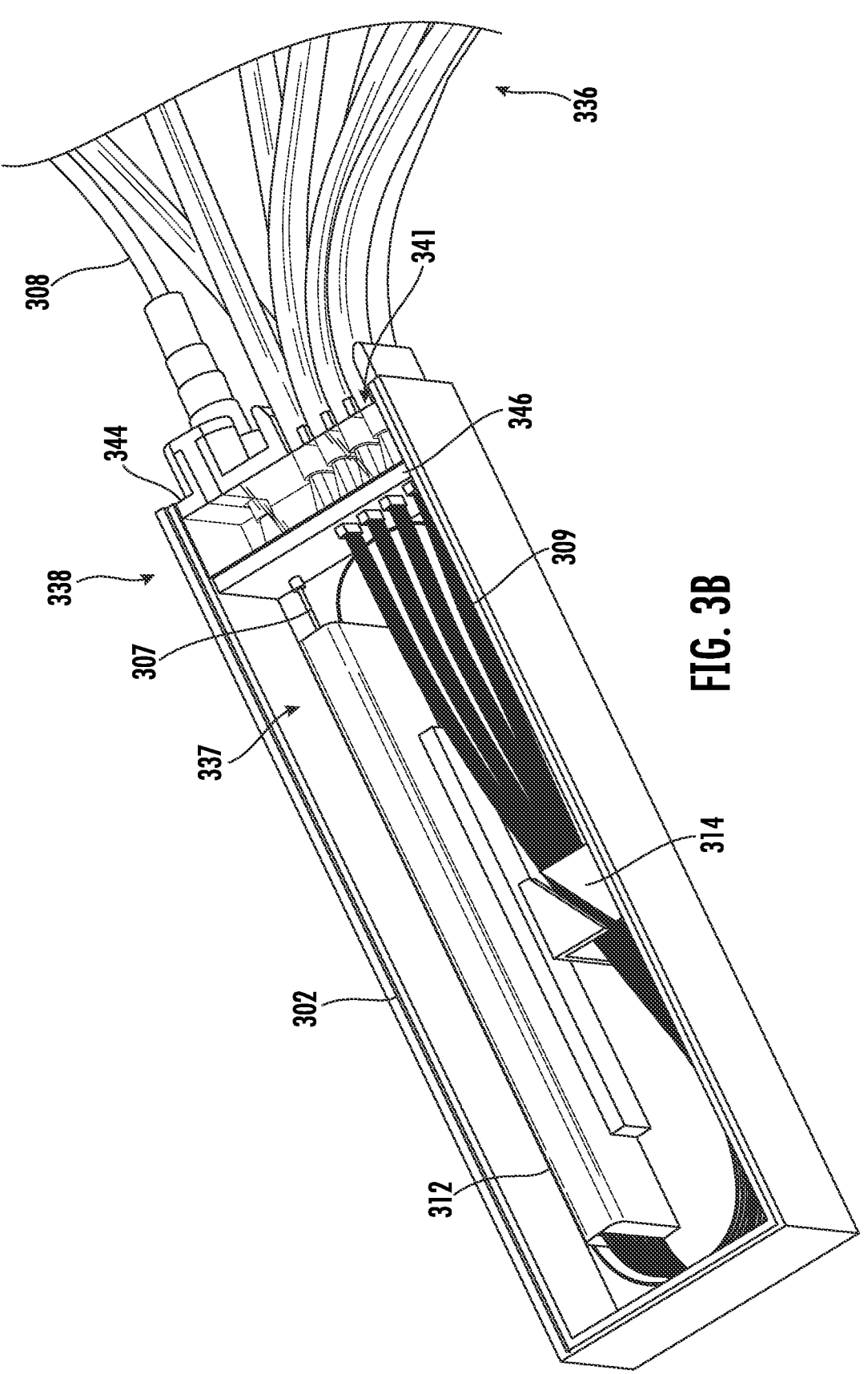
FIGS. 3B-3C are enhanced perspective views illustrating the optical splitter module of FIG. 3A where a top cover of the optical splitter module is removed, in accordance with some embodiments discussed herein.

Looking now at FIG. 3B, internal portions of the optical splitter module 302 may be seen as the top cover 304 (see FIG. 3A) is removed. In FIG. 3B, a covered input optical fiber 308 and fiber ribbons 336 containing output optical fibers may be seen extending into the optical splitter module 302. The covered input optical fiber 308 and the fiber ribbons 336 may extend through openings 341 in the wall of the optical splitter module 302, with the optical splitter module 302 being configured to receive a portion of the fiber ribbons 336. The covered input optical fiber 308 may include an input connector 308A at an end of the covered input optical fiber 308.

Protective tubing provided in the covered input optical fiber 308 and the fiber ribbons 336 may be removed for portions of the optical fibers that are retained within the optical splitter module 302. Thus, the input optical fiber 307 and the output optical fibers 309 may be provided without any protective tubing in certain portions of the internal volume 337 of the optical splitter module 302. By doing so, the internal volume 337 required to hold the optical fibers may be reduced. Furthermore, removal of protective tubing may further reduce the minimum bending radius for the optical fibers, and this may also permit a reduction in the size of the internal volume 337 of the optical splitter module 302. The input optical fiber 307 and the output optical fibers 309 may be routed within the internal volume 337 of the optical splitter module 302 using the routing guides 314.

The input optical fiber 307 and the output optical fibers 309 are routed through a void 338 that is formed between two walls 344, 346 in the optical splitter module 302, and the input optical fiber 307 and the output optical fibers 309 may extend through openings into the internal volume 337 of the optical splitter module 302.

The input optical fiber 307 and output optical fibers 309 are routed to the splitter device 312, and these optical fibers are connected to the splitter device 312. In the illustrated embodiment, one input optical fiber 307 and sixty-four (64) output optical fibers 309 are connected to the splitter device 312, and the splitter device 312 is configured to split input signals from the input optical fiber 307 into the sixty-four (64) output optical fibers 309. However, a different number of input optical fibers 307 and output optical fibers 309 may be used in other embodiments.

Figure 3C:
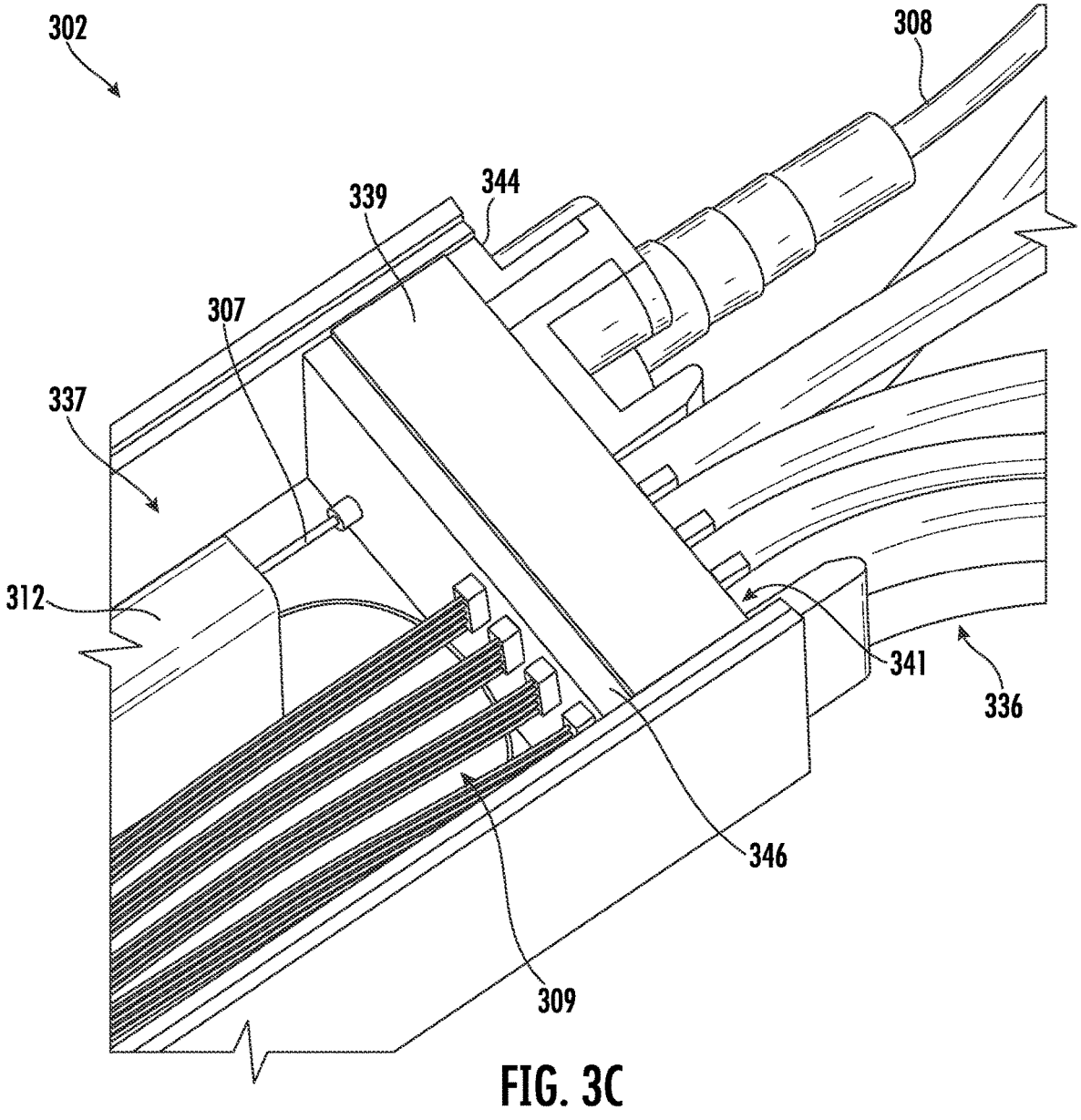
Figure 3D:
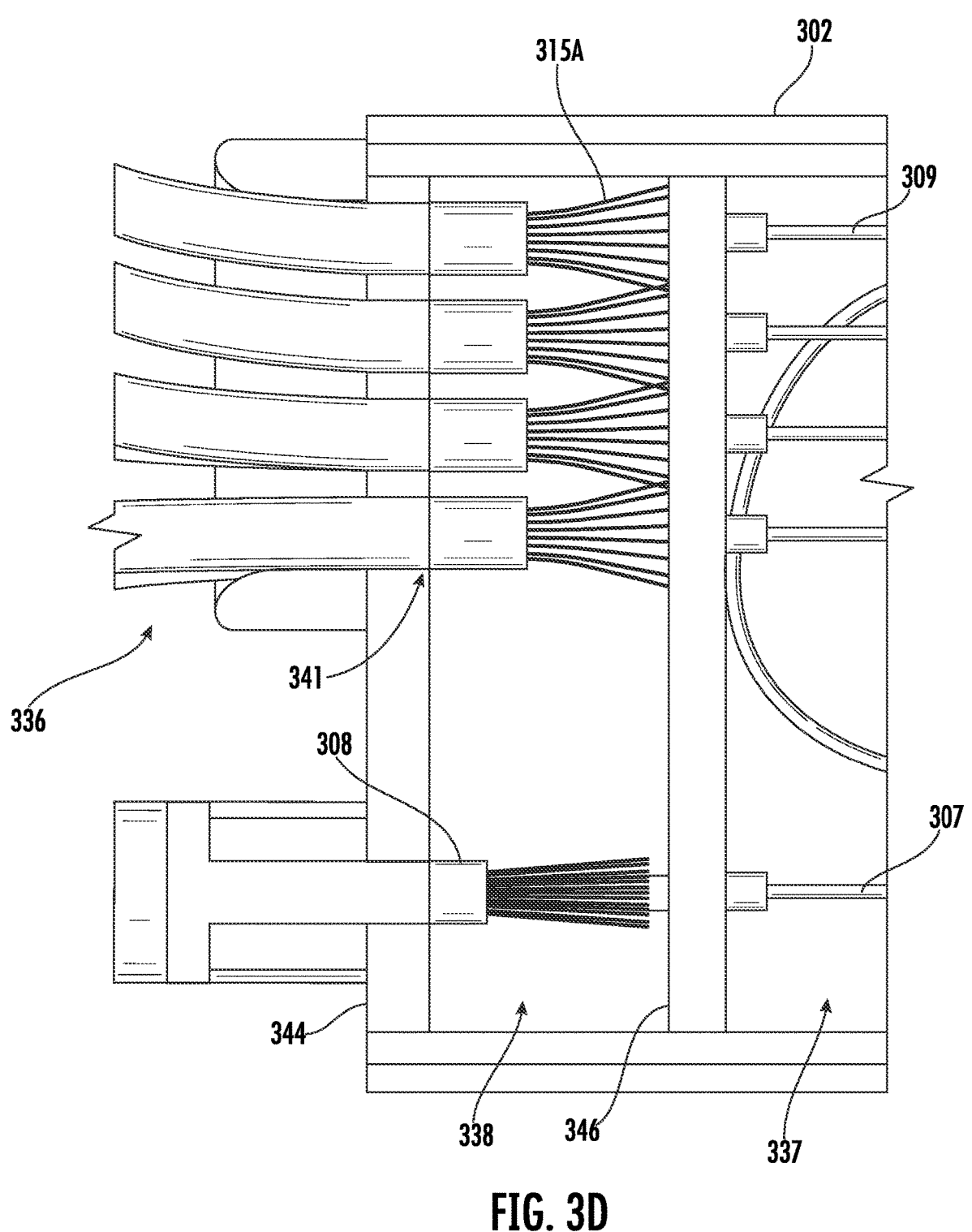
FIG. 3D is an enhanced top view illustrating an input optical fiber and output optical fibers routed within the optical splitter module with the top cover of the optical splitter module being removed, in accordance with some embodiments discussed herein.

Further details regarding how optical fibers are routed in the optical splitter module 302 may be seen in FIGS. 3C-3D. FIG. 3C is an enhanced perspective view illustrating the optical splitter module 302 of FIG. 3A where a top cover 304 (see FIG. 3A) of the optical splitter module 302 is removed, and FIG. 3D is an enhanced top view illustrating an input optical fiber 307 and output optical fibers 309 routed within the optical splitter module 302 with the top cover 304 of the optical splitter module 302 being removed. While a top wall 339 is illustrated in FIG. 3C, this top wall 339 is made transparent in FIG. 3D so that a void 338 underneath this top wall 339 may be seen.

As illustrated in FIG. 3C, output optical fibers 309 may be grouped together into one or more groupings as the output optical fibers 309 extend out of the optical splitter module

302. In the illustrated embodiment, each of the groupings of output optical fibers 309 extend to a respective fibber ribbon 336, and the fiber ribbons 336 containing output optical fibers 309 advance through openings 341 in the wall 344. In the illustrated embodiment, eight fiber ribbons 336 (or eight groupings of output optical fibers 309) advance through openings in the wall 344, with the fiber ribbons 336 arranged in two rows and four columns. Additionally, the covered input optical fiber 308 advances through an opening in the wall 344. The portions of the covered input optical fiber 308 or the fiber ribbons 336 that advance into the void 338 and the internal volume 337 of the optical splitter module 302 may have some or all of the protective tubing removed, and the removal of this protective tubing may be completed before these components are inserted into the optical splitter module 302. The input optical fiber 307, the output optical fibers 309, and any protective tubing provided around these optical fibers may advance through the void 338 until these components reach the wall 346. These components may advance through openings formed in the wall 346 so that the components may extend into the internal volume 337 of the optical splitter module 302. As the input optical fiber 307, the output optical fibers 309, and any protective tubing for those optical fibers advance through openings in the wall 344 and the wall 346, the wall 344 and the wall 346 may be configured to provide strain relief for the optical fibers. This may occur as the wall 344 and the wall 346 may generate friction on the protective tubing of the optical fibers. Additionally, the void 338 may be configured to receive epoxy so that movement of the optical fibers retained in the void 338 may be at least partially restricted. In some embodiments, a hole may be provided in the top wall 339 of the optical splitter module 302 or a hole may be provided at another location in the optical splitter module 302, and the hole may be configured to permit epoxy to be easily inserted into the void 338. As illustrated in FIG. 3D, aramid threads 315A may be provided in the covered input and output optical fibers, and the aramid threads 315A may form bonds with epoxy that is provided in the void 338. These bonds may assist in providing strain relief for the protection of input and output optical fibers.

While the groupings of output optical fibers 309 extend from the optical splitter module 302 to the external fanout device 334 in fiber ribbons 336, the groupings may extend from the optical splitter module 302 to the external fanout device 334 in other ways. For example, output optical fibers 309 in the same grouping may extend independently from one another without being secured together, or the output optical fibers may be secured together in other ways.

Figure 3E:
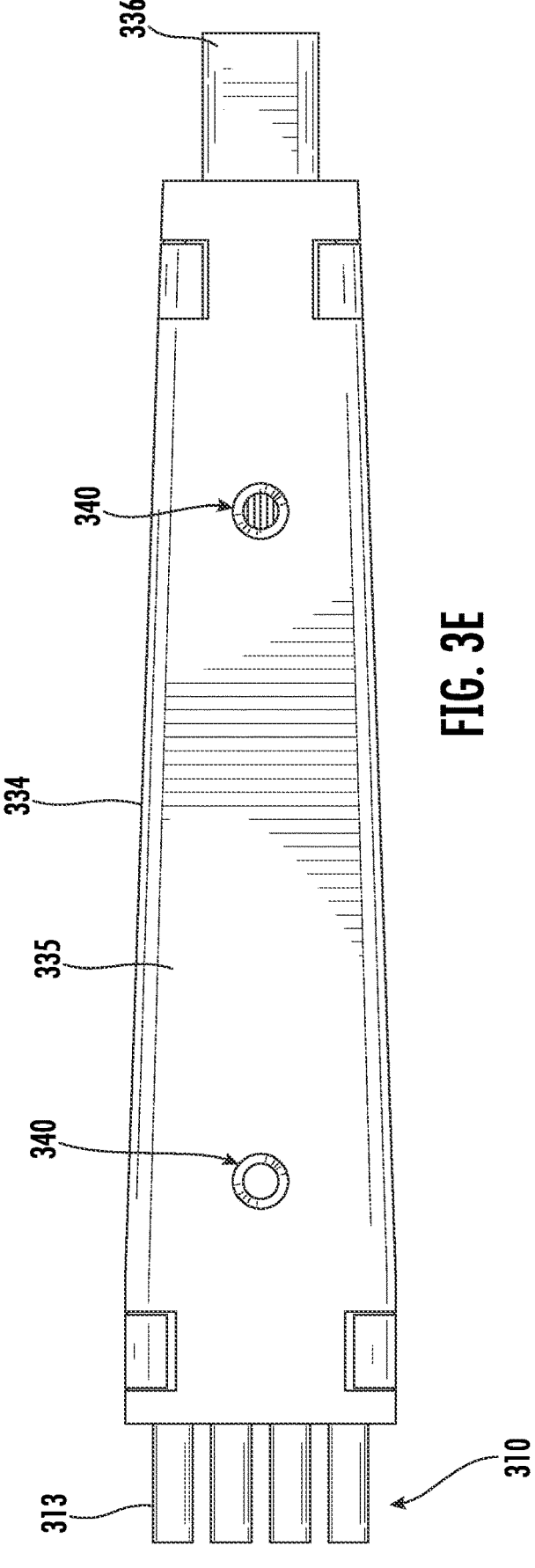
FIG. 3E is a side view illustrating the external fanout device of FIG. 3A, in accordance with some embodiments discussed herein.
Figure 3F:
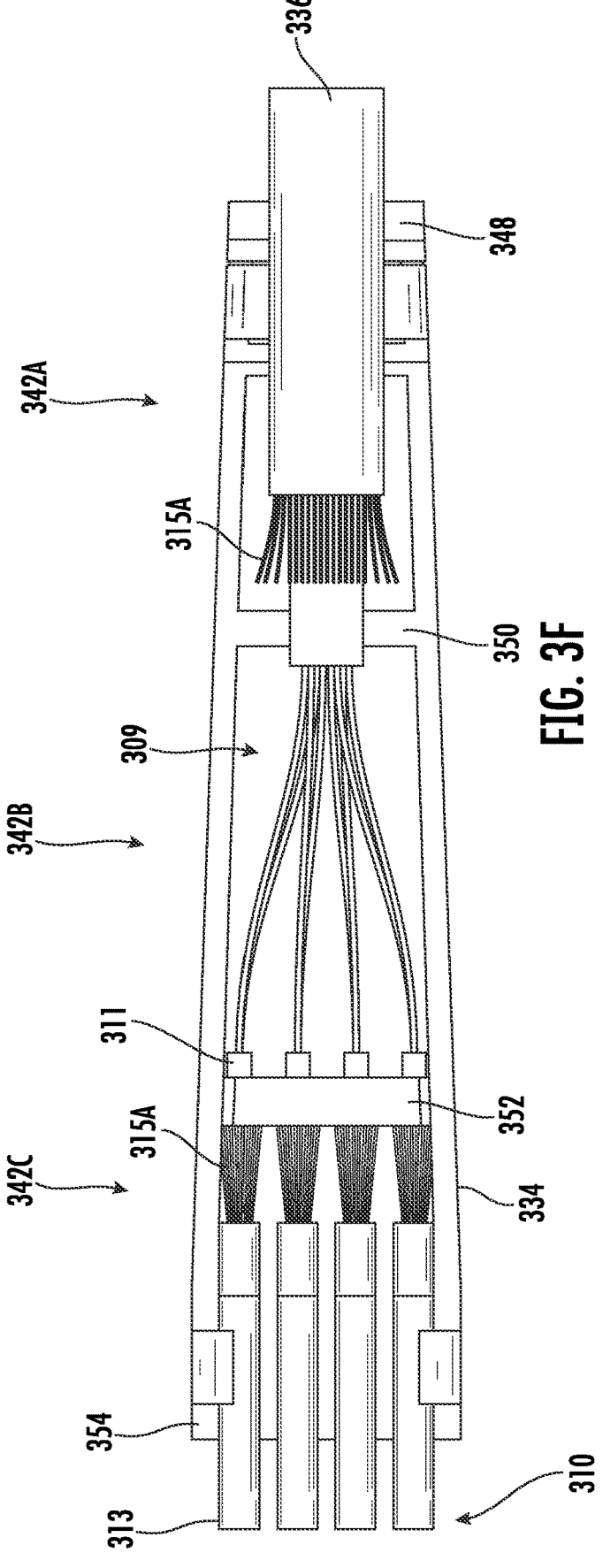
FIG. 3F is a side view illustrating the external fanout device of FIG. 3E where a cover of the external fanout device is removed, in accordance with some embodiments discussed herein.

Further features of the external fanout device of FIG. 3A may be seen in FIGS. 3E and 3F. FIG. 3E is a side view illustrating the external fanout device 334 of FIG. 3A, and a cover 335 is included on the external fanout device 334 in FIG. 3E. In FIG. 3F, a side view is provided illustrating the external fanout device 334 with the cover 335 of the external fanout device 334 being hidden so that internal components of the external fanout device 334 may be seen.

Looking first at FIG. 3E, a fiber ribbon 336 is received within an opening in the external fanout device 334, and the output optical fibers 309 provided in the fiber ribbon 336 may be part of the same grouping of optical fibers. Individual covered output optical fibers 310 extend out of the external fanout device 334, with the individual covered output optical fibers 310 being separate from each other. The individual covered output optical fibers 310 include protective tubing in the form of the outer tubing 313. Furthermore, the cover 335 may include one or more holes 340. By providing these holes 340, the external fanout device 334 may be configured to receive epoxy in the internal volume of the external fanout device 334 through the hole(s) 340 to at least partially restrict movement of the output optical fibers 309 (see FIG. 3F) in the external fanout devices 334. For example, looking at FIG. 3F, epoxy received through the holes 340 may be received in the first open section 342A and the third open section 342C to at least partially restrict the movement of the fiber ribbons 336 or the output optical fibers 309 and any protective tubing around these optical fibers. Notably, this provides strain relief in both directions (as the external fanout device 334 "hangs" freely down from the optical splitter module 302).

Looking now at FIG. 3F, further details of the inner workings of the external fanout device 334 may be seen. A fiber ribbon 336 is received within an opening in the external fanout device 334. The fiber ribbon 336 may provide two or more layers of protective tubing around the output optical fibers 309. The fiber ribbon 336 may advance through a boundary wall 348 of the external fanout device into the first open section 342A. The fiber ribbon 336 may extend through the first open section 342A, and this first open section 342A may be configured to receive epoxy material in some embodiments to assist in at least partially restricting the movement of the fiber ribbon 336 within the first open section 342A. The fiber ribbon 336 or output optical fibers 309 provided in the fiber ribbon 336 may then advance through an opening in another wall 350 to advance into the second open section 342B. Within the second open section 342B, the output optical fibers 309 may be provided without any protective tubing, and this may be beneficial to permit the output optical fibers 309 within the ribbon to be separated from each other. This may also be beneficial to permit movement of the output optical fibers 309 to accommodate temperature fluctuations. The output optical fibers 309 may advance through another wall 352 as it proceeds from the second open section 342B to the third open section 342C, and the output optical fibers 309 may be protected by protective tubing in the form of inner tubing 311 as the output optical fibers 309 advance through this wall 352. The output optical fibers 309 may extend through the third open section 342C, and this third open section 342C may be configured to receive epoxy material in some embodiments to assist in at least partially restricting the movement of the output optical fibers 309 within the third open section 342C. At the third open section 342C, the output optical fibers 309 may extend through a boundary wall 354 so that the output optical fibers 309 may exit the external fanout device 334 as covered output optical fibers 310. As the output optical fibers 309 (and any protective tubing provided therewith) or fiber ribbons 336 extend through openings in the walls 348, 350, 352, 354, these walls may compress and provide friction on the protective tubing around the output optical fibers 309 or the fiber ribbons 336 to provide strain relief. External fanout devices 334 may be mounted to other objects in some embodiments, but the external fanout device 334 may be configured to hang freely. In some embodiments, external fanout devices 334, fiber ribbons 336, and/or covered output optical fibers 310 may be color coded, such as to enable ease of maintenance, assembly, and/or cable determination.

While various assemblies and apparatuses are discussed herein, various methods of manufacture for these assemblies and apparatuses are also contemplated. FIGS. 5 and 6 provide two example methods of manufacture that may be taken. FIG. 5 provides a method of manufacture for an optical splitter assembly using a fanout device that is provided inside of an optical splitter module, and FIG. 6 provides a method of manufacture for an optical splitter assembly having an external fanout device.

FIG. 5 is a flow chart illustrating an example method 500 of manufacture for an optical splitter module used for splitting an input signal from an input optical fiber. At operation 502, an optical splitter module, a splitter device, an input optical fiber, output optical fibers, and a fanout device are provided. The optical splitter module defines an internal volume and an exit cavity, and other components may be installed in the internal volume of the optical splitter module. The splitter device may be configured to split an input signal from the input optical fiber into a plurality of output signals that are each directed into one of the output optical fibers. Additionally, the fanout device may define openings that are each configured to receive an output optical fiber. The fanout device may have a non-linear shape (see, e.g., fanout device 120 of FIG. 1H), or the fanout device may extend diagonally in the optical splitter module. Additionally, at operation 504, the splitter device and the fanout device are installed in the optical splitter module.

At operation 506, protective tubing may be removed from the input optical fiber and the output optical fibers. Protective tubing may be removed for portions of the input optical fiber and the output optical fibers that rest within the internal volume of the optical splitter module.

At operation 508, input optical fiber and output optical fibers are routed to the fanout device. Input optical fiber and output optical fibers are routed from the fanout device to the splitter device at operation 510. At operation 512, the input optical fiber and the output optical fibers are connected to the splitter device. In some embodiments, epoxy may be applied to the input optical fiber and/or to the output optical fibers at operation 514.

FIG. 6 is a flow chart illustrating an example method 600 of manufacture for an optical splitter assembly using external fanout devices. At operation 602, an optical splitter module, a splitter device, an input optical fiber, output optical fibers, and an external fanout device are provided. The splitter device may be configured to split an input signal from the input optical fiber into output signals that are each directed into respective output optical fibers.

At operation 604, the splitter device is installed in the optical splitter module. Output optical fibers are routed to the external fanout device at operation 606. Further, at operation 608, the input optical fiber and the output optical fibers are routed to the optical splitter module. The output optical fibers may be routed to the optical splitter module in fiber ribbons.

At operation 610, protective tubing may be removed from the input optical fiber and the output optical fibers. Protective tubing may be removed for portions of the input optical fiber and the output optical fibers that rest within the internal volume of the optical splitter module.

At operation 612, the input optical fiber and the output optical fibers may be routed to the splitter device, and the input optical fiber and the output optical fibers are connected to the splitter device at operation 614. In some embodiments, epoxy may be applied to the input optical fiber and/or to the output optical fibers at operation 616.

For the methods illustrated in FIGS. 5 and 6, the listed operations may be performed in any order, and certain operations may be performed simultaneously in some embodiments. Furthermore, certain operations may be omitted in some embodiments. For example, while epoxy may be added at operation 614 of the method 600 or at operation 514 of the method 500, epoxy may not be added in other embodiments. Additionally, further operations may be performed above and beyond the operations listed in FIGS. 5 and 6.

It will therefore be readily understood by those persons skilled in the art that the present invention is susceptible of broad utility and application. Many embodiments and adaptations of the present invention other than those herein described, as well as many variations, modifications, and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications, and equivalent arrangements.

What is claimed is:

1. An optical splitter module for splitting an input signal from an input optical fiber, the optical splitter module comprising:
   the input optical fiber;
   a plurality of output optical fibers;
   a splitter device configured to split the input signal from the input optical fiber into a plurality of output signals that are each directed into one of the plurality of output optical fibers; and
   a fanout device defining a plurality of openings that are each configured to receive an output optical fiber of the plurality of output optical fibers,
   wherein the optical splitter module defines an internal volume and an exit cavity, wherein the input optical fiber, the plurality of output optical fibers, the splitter device, and the fanout device are each received in the internal volume, wherein the fanout device defines a side length, wherein the exit cavity defines a width, wherein the side length of the fanout device is greater than the width of the exit cavity;
   wherein the fanout device extends diagonally with respect to the exit cavity in the optical splitter module.

2. The optical splitter module of claim 1, wherein the fanout device is configured to receive a portion of covered output optical fibers, wherein the covered output optical fibers each include protective tubing.

3. The optical splitter module of claim 2, wherein the covered output optical fibers extend through the exit cavity, wherein the width of the exit cavity is 1.68 inches or less.

4. The optical splitter module of claim 2, wherein each of the covered output optical fibers have a diameter of approximately 0.063 inches.

5. The optical splitter module of claim 1, wherein a split density is a number of output optical fibers in the optical splitter module divided by a number of input optical fibers in the optical splitter module as well as a volume of the optical splitter module, wherein the split density of the optical splitter module is greater than five or more splits per cubic inch.

6. The optical splitter module of claim 5, wherein the split density of the optical splitter module is 13.6 or more splits per cubic inch.

7. The optical splitter module of claim 6, wherein the split density of the optical splitter module is 17.3 or more splits per cubic inch.

8. The optical splitter module of claim 5, wherein the plurality of output optical fibers are each bend insensitive fibers.

9. The optical splitter module of claim 5, wherein the plurality of output optical fibers each possess a minimum bending radius of approximately 5 millimeters or less.

10. The optical splitter module of claim 5, wherein the plurality of output optical fibers are each ITU-T G.657.B3 fibers.

11. The optical splitter module of claim 1, wherein the fanout device is integrally attached to the optical splitter module.

12. The optical splitter module of claim 1, wherein the fanout device is removably attachable to the optical splitter module.

13. The optical splitter module of claim 1, wherein the fanout device is configured to provide strain relief for the plurality of output optical fibers.

14. The optical splitter module of claim 1, wherein the fanout device defines an internal cavity, wherein the internal cavity is configured to receive an epoxy to at least partially restrict movement of the plurality of output optical fibers in the internal cavity.

15. The optical splitter module of claim 14, wherein an opening of the plurality of openings is configured to receive three or more output optical fibers.

16. The optical splitter module of claim 15, wherein covered output optical fibers are each received in an opening of the plurality of openings.

17. The optical splitter module of claim 1, wherein the side length of the fanout device being greater than the width of the exit cavity permits additional openings to be provided in the fanout device so that additional output optical fibers may be received in the fanout device.

18. An optical splitter module for splitting an input signal from an input optical fiber, the optical splitter module comprising:
   the input optical fiber;
   a plurality of output optical fibers;
   a splitter device configured to split the input signal from the input optical fiber into a plurality of output signals that are each directed into one of the plurality of output optical fibers; and
   a fanout device defining a plurality of openings that are each configured to receive an output optical fiber of the plurality of output optical fibers to control an exit position thereof,
   wherein the fanout device extends diagonally with respect to an exit cavity in the optical splitter module;
   wherein a split density is a number of output optical fibers in the optical splitter module divided by a number of input optical fibers in the optical splitter module as well as a volume of the optical splitter module, wherein the split density of the optical splitter module is greater than five or more splits per cubic inch.

19. The optical splitter module of claim 18, wherein the fanout device is configured to receive a portion of covered output optical fibers, wherein the covered output optical fibers each include protective tubing.

20. The optical splitter module of claim 18, wherein the split density of the optical splitter module is 17.3 or more splits per cubic inch.

21. An optical splitter module for splitting an input signal from an input optical fiber, the optical splitter module comprising:
   the input optical fiber;
   a plurality of output optical fibers;

a splitter device configured to split the input signal from the input optical fiber into a plurality of output signals that are each directed into one of the plurality of output optical fibers; and a fanout device defining a plurality of openings that are each configured to receive an output optical fiber of the plurality of output optical fibers, wherein the optical splitter module defines an internal volume and an exit cavity, wherein the input optical fiber, the plurality of output optical fibers, the splitter device, and the fanout device are each received in the internal volume, wherein the fanout device extends diagonally in the optical splitter module with respect to the exit cavity.

22. A fanout device for use in an optical splitter module for splitting an input signal from an input optical fiber into a plurality of output signals that are each directed into one of a plurality of output optical fibers, the fanout device having walls that define a plurality of openings, wherein the plurality of openings are configured to receive the input optical fiber and the plurality of output optical fibers, wherein the fanout device extends diagonally in the optical splitter module, wherein the fanout device is configured to provide strain relief to the input optical fiber and the plurality of output optical fibers.

23. A method of manufacturing an optical splitter module used for splitting an input signal from an input optical fiber, the method comprising:

providing an optical splitter module;

providing the input optical fiber;

providing a plurality of output optical fibers;

providing a splitter device configured to split the input signal from the input optical fiber into a plurality of output signals that are each directed into one of the plurality of output optical fibers;

providing a fanout device defining a plurality of openings that are each configured to receive an output optical fiber of the plurality of output optical fibers;

installing the splitter device in the optical splitter module;

installing the fanout device in the optical splitter module;

routing the plurality of output optical fibers to the fanout device; and connecting the input optical fiber and the plurality of output optical fibers to the splitter device, wherein the optical splitter module defines an internal volume and an exit cavity, wherein the input optical fiber, the plurality of output optical fibers, the splitter device, and the fanout device are each received in the internal volume, wherein the fanout device extends diagonally in the optical splitter module.

24. The method of claim 23, further comprising:

applying epoxy to at least one of the input optical fiber or the output optical fibers.

* * * * *